United States Patent [19]

Black, Sr. et al.

[11] Patent Number: 5,522,310
[45] Date of Patent: Jun. 4, 1996

[54] APPARATUS FOR HEATING AND DISPENSING FOOD

[76] Inventors: Gary W. Black, Sr., 1136 Ebelhare Rd., Pottstown, Pa. 19464; David Garvey, 1973 Blue Fox Dr., Lansdale, Pa. 19446

[21] Appl. No.: 375,191

[22] Filed: Jan. 18, 1995

Related U.S. Application Data

[63] Continuation of Ser. No. 43,164, Apr. 5, 1993, abandoned, which is a continuation of Ser. No. 770,616, Oct. 3, 1991, abandoned, which is a continuation-in-part of Ser. No. 595,583, Oct. 10, 1990, abandoned.

[51] Int. Cl.⁶ ...................................................... G07F 11/00
[52] U.S. Cl. ................... 99/357; 221/150 HC; 221/113
[58] Field of Search ................... 99/357, 342; 221/2, 221/113, 7, 265, 13, 123, 129, 150 HC, 150 A, 150 R, 151, 133, 188; 340/566; 219/10.55 F, 10.55 A, 10.55 R, 10.55 E; 426/107, 113, 118, 128, 234, 549, 618, 622, 629, 634

[56] References Cited

U.S. PATENT DOCUMENTS

| | | | |
|---|---|---|---|
| 581,194 | 4/1897 | Buerdsell | 221/113 |
| 3,653,541 | 4/1972 | Crum | 221/150 HC |
| 3,706,395 | 12/1972 | Havener et al. | 221/119 |
| 3,838,790 | 10/1974 | Naruse | 99/357 |
| 3,928,045 | 12/1975 | Tsunoda et al. | 99/357 |
| 4,191,876 | 3/1980 | Ohkubo et al. | 219/10.55 F |
| 4,398,651 | 8/1983 | Kumphfer | 99/357 |
| 4,632,274 | 12/1986 | Garbe | 221/96 |
| 4,783,582 | 11/1988 | Wada et al. | 99/357 |
| 4,788,829 | 12/1988 | Takemasa et al. | 62/335 |
| 4,813,572 | 3/1989 | Schmidt | 99/357 |
| 4,857,685 | 8/1989 | Vigano et al. | 219/10.55 F |
| 4,915,205 | 4/1990 | Reid et al. | 221/119 |
| 5,111,962 | 5/1992 | Oden | 221/13 |
| 5,144,879 | 9/1992 | Alessi | 99/357 |
| 5,159,560 | 10/1992 | Newell et al. | 221/119 |

FOREIGN PATENT DOCUMENTS

| | | | |
|---|---|---|---|
| 793641 | 1/1936 | France | 221/113 |
| 2626394 | 7/1989 | France | 221/121 |
| 02901 | 4/1988 | WIPO . | |

*Primary Examiner*—Timothy F. Simone
*Assistant Examiner*—Tony G. Soohoo
*Attorney, Agent, or Firm*—Panitch Schwarze Jacobs & Nadel

[57] ABSTRACT

A completely automatic, fully self-contained vending machine of standard size which may be operated so that a packaged (boxed) dough-based food product such as a pizza can be withdrawn from a freezer for storing the food product, and delivered to a microwave oven for heating to an appropriate temperature, for delivery (of the heated and cooked food product) to the consumer within a relative short, commercially-desirable time period on the order of one minute or less. Also, a special, high intensity microwave oven which incorporates directionally variable guide vanes for regulating the microwave cooking process with improved efficiency; a dough-based food product (such as a pizza or the like) constituted of a dough which is specially blended for interacting with the microwave oven to achieve rapid cooking times while simultaneously providing a cooked food product of improved taste, quality and consistency; and a carton for containing the food product which is formed in a manner which facilitates all phases of the food-dispensing process including freezing, microwave cooking, and eventual delivery to the consumer.

11 Claims, 22 Drawing Sheets

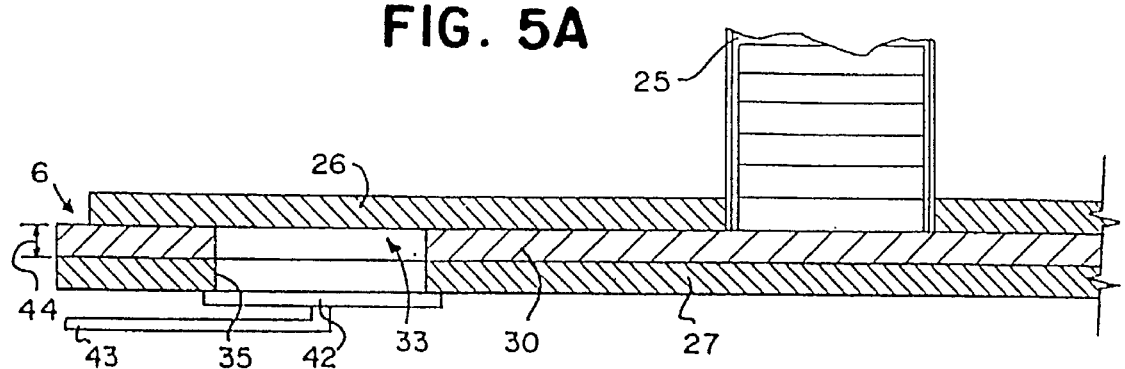
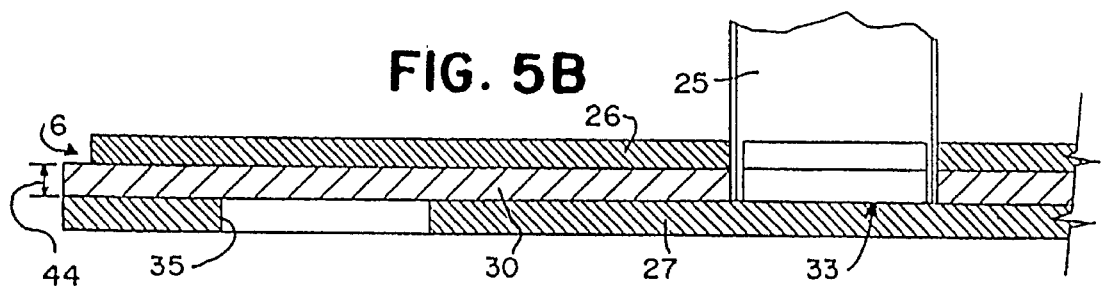
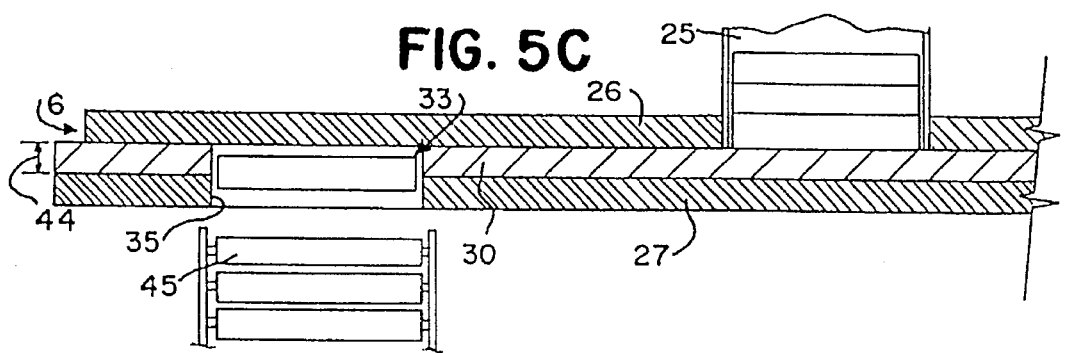

1

APPARATUS FOR HEATING AND DISPENSING FOOD

RELATED CASES

This is a continuation of prior U.S. patent application Ser. No. 08/043,164, filed Apr. 5, 1993, now abandoned, which is a continuation of prior U.S. patent application Ser. No. 07/770,616, filed Oct. 3, 1991, now abandoned, which is itself a continuation-in-part of prior U.S. patent application Ser. No. 07/595,583, filed Oct. 10, 1990, now abandoned.

BACKGROUND OF THE INVENTION

The present invention generally relates to devices for heating and dispensing food products, particularly vending machines for dispensing heated food products.

Money-actuated, or so-called "vending" machines have long been used to vend various different types of food products. Originally, such machines were used to vend food products which either could remain at room temperature, or which needed to be cooled. However, it has recently become increasingly popular to vend food products which are to be served warm or hot, and which therefore need to be heated.

Examples of machines which have been developed to dispense warm and/or heated food products may be found with reference to U.S. Pat. No. 4,838,455; 4,398,651; 3,620,341; 3,534,676; and 3,245,581, among others. Collectively, these patents illustrate vending machines for storing a refrigerated food product which, responsive to operation of the vending machine, is dispensed from the refrigeration unit for delivery to a heating device, followed by delivery of the heated food product from the apparatus at an appropriate dispensing point. These devices are used to dispense heated food products of different types, and generally vary depending upon the type of food product which is to be vended. However, in practice, it has been found that vending machines of this general type are subject to certain limitations.

For example, an important consideration in the dispensing of food products from vending machines is one of convenience. It is generally recognized that the desire to obtain food products from vending machines is heavily dependent upon considerations of time. In dispensing food products at room temperature, or at reduced temperatures, such considerations are not important since the desired food product can be vended directly from the storage compartment of the vending machine. However, in dispensing food products which need to be warmed, or even heated, considerations of time become significantly more important in that a certain amount of time is necessary to properly raise the temperature of the food product which is to be dispensed, prior to its delivery from the vending machine. Indeed, it is generally believed by those in the industry that time periods of even two or three minutes could represent a significant impediment to the interest on the part of the general public in obtaining heated food from a vending machine. Prevailing opinion is that consumer interest is generally limited to time periods on the order of one minute, or less, representing a rather short period of time in which to completely heat and vend a given food product.

Yet another consideration is that of the food product which is to be dispensed from the vending machine. Certain types of foods are well suited to rapid heating techniques, using any of a variety of oven types (e.g., electric heating, infrared heating, convection heating, microwave heating, etc.). Examples of these are available with reference to the patents which are identified above. However, it has been found that some food products are not well suited to heating and dispensing from a vending machine. One example of this is the pizza, which the above-described devices are not well suited to handling.

A key reason for this is that despite the wide popularity of pizza, which is one of the largest, single consumed food types in the United States, food service companies have been unable to produce a frozen pizza which is suited to rapid heating and cooking techniques adaptable to a vending machine. Specifically, a pizza which is well suited to microwave cooking, one of the most rapid cooking techniques available, has not yet been developed. As a result of this, vending machines for handling pizza products have not been forthcoming.

The reasons for this are primarily two-fold. First, even the best so-called "microwaveable" pizzas tend to be less than acceptable in consistency. Available pizza products exhibit drawbacks ranging from very poor taste, to unacceptably doughy crusts, extremely and/or hard chewing crusts, uneven cooking, and at times, a cardboard like consistency. Second, available "microwaveable" pizzas could not, even under the best of circumstances, be cooked in less than approximately three minutes, significantly in excess of the period of time deemed advisable for maintaining consumer interest in obtaining a particular food product from a vending machine.

For this reason, although a variety of vending machines have been developed for dispensing heated and/or cooked food products, none has been developed which is capable of satisfactorily vending a pizza (or other equivalent dough-based food product), despite the significant popularity which the pizza enjoys.

SUMMARY OF THE INVENTION

It is therefore the primary object of the present invention to provide a vending machine for dispensing heated and/or cooked food products with improved effectiveness.

It is also an object of the present invention to provide a vending machine for automatically dispensing heated and/or cooked food products which is fully self-contained, and capable of effective stand-alone operation.

It is also an object of the present invention to provide a vending machine which can take a food product which is originally stored in frozen condition, and which can then heat and/or cook the food product for delivery to an appropriate dispensing point with improved efficiency.

It is also an object of the present invention to provide a vending machine which can prepare and deliver a heated and/or cooked food product to a consumer within a desirable period of time, generally on the order of one minute or less.

It is also an object of the present invention to provide a vending machine which can accomplish the foregoing improvements making use of microwave cooking techniques as the heating medium.

It is also an object of the present invention to provide a vending machine which incorporates an improved microwave cooking system for achieving the foregoing improvements.

It is also an object of the present invention to provide a vending machine which is capable of heating and/or cooking and dispensing a dough-based food product, such as a pizza.

It is also an object of the present invention to provide a vending machine which is capable of heating and/or cooking and dispensing a dough-based food product such as a pizza, having a consistency on the order of that of a conventionally prepared food product, despite its preparation making use of microwave cooking techniques.

It is also an object of the present invention to provide a dough-based food product, such as a pizza, which can be rapidly heated and/or cooked making use of microwave cooking techniques while maintaining its taste, quality and consistency, and which is suited to dispensing from a vending machine having the above-described qualities.

It is also an object of the present invention to provide a container for receiving a food product which is to be heated and/or cooked making use of microwave cooking techniques, which itself contributes to the food-preparing steps which are required, and which is suited to the dispensing of food products from a vending machine having the above-described capabilities.

These and other objects are achieved in accordance with the present invention by providing a completely automatic, fully self-contained vending machine of standard size which may be operated so that a packaged (boxed) dough-based food product such as a pizza can be withdrawn from a freezer for storing the food product, and delivered to a microwave oven for heating to an appropriate temperature, for delivery (of the heated and cooked food product) to the consumer within a relative short, commercially-desirable time period on the order of one minute or less.

To this end, a vending system is provided which incorporates various different improvements for achieving such a result. The operating controls of the vending machine are designed for simple operation, yet are designed to accept coin, bill and/or credit card payment. The freezer of the vending machine is designed to store as much food product as is reasonably possible, while facilitating servicing of the unit (including refilling operations). A special, high intensity microwave oven is provided, which if desired, can further incorporate directionally variable guide vanes for regulating the microwave cooking process with improved efficiency. The food product to be heated and/or cooked, primarily a dough-based food product such as a pizza or the like, is constituted of a dough which is specially blended for interacting with the microwave oven to achieve rapid cooking times while simultaneously providing a cooked food product of improved taste, quality and consistency. This is facilitated by a carton for containing the food product which is formed in a manner which facilitates all phases of the food-dispensing process including freezing, microwave cooking, and eventual delivery to the consumer.

For further detail regarding a vending machine and associated food products having the foregoing capabilities, reference is made to the detailed description which is provided below, taken in conjunction with the following illustrations.

BRIEF DESCRIPTIO OF THE DRAWINGS

FIGS. 5A, 5B and 5C are sectional views schematically illustrating the dispensing of food products from the freezer of the vending machine.

In the several views provided, like reference numbers denote similar structures.

DETAILED DESCRIPTION OF THE PREFERRED EMBODIMENT

Figure 1:
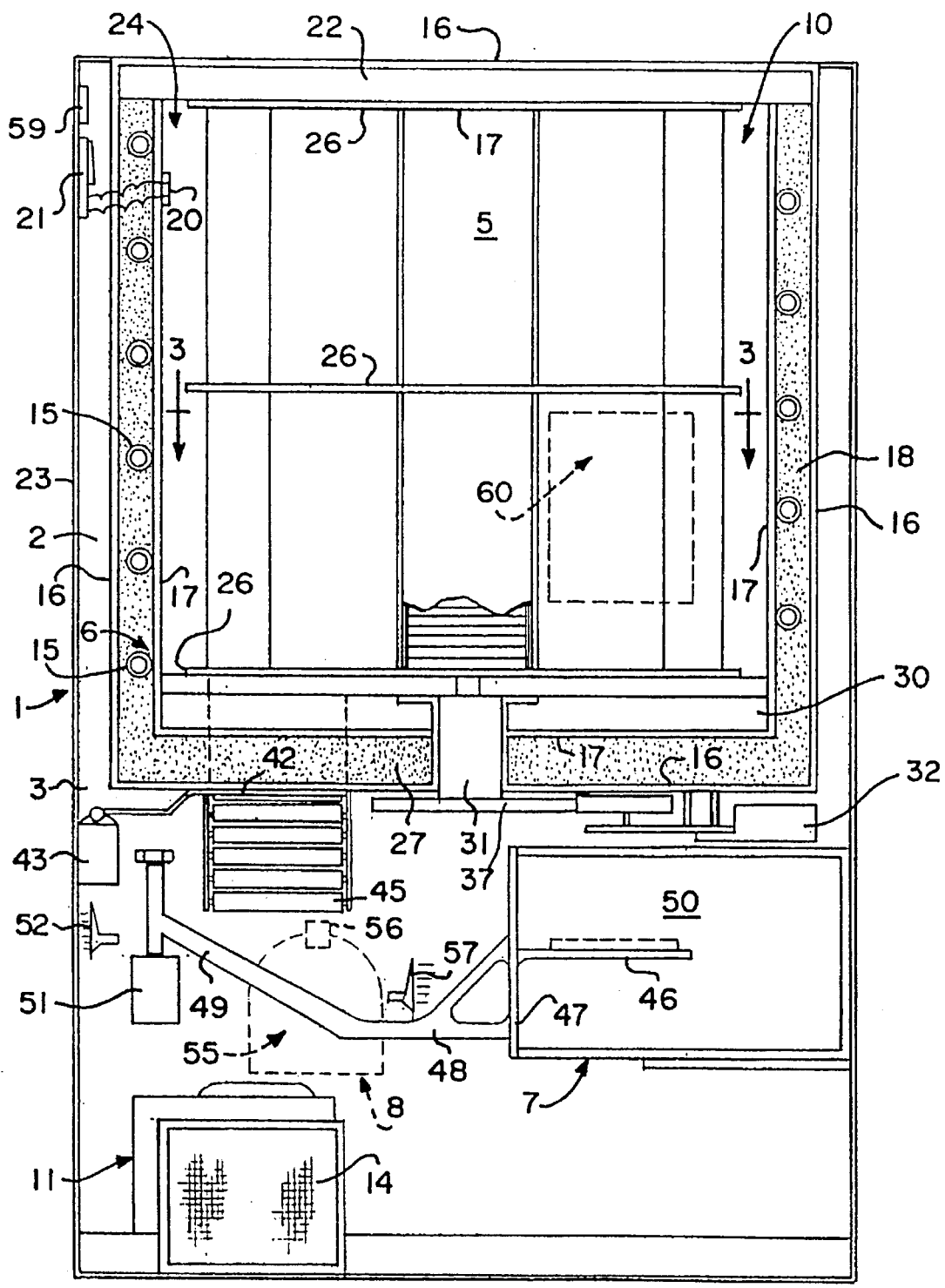
FIG. 1 is a cross-sectional view of the vending machine of the present invention, showing its internal components from the front.
Figure 2:
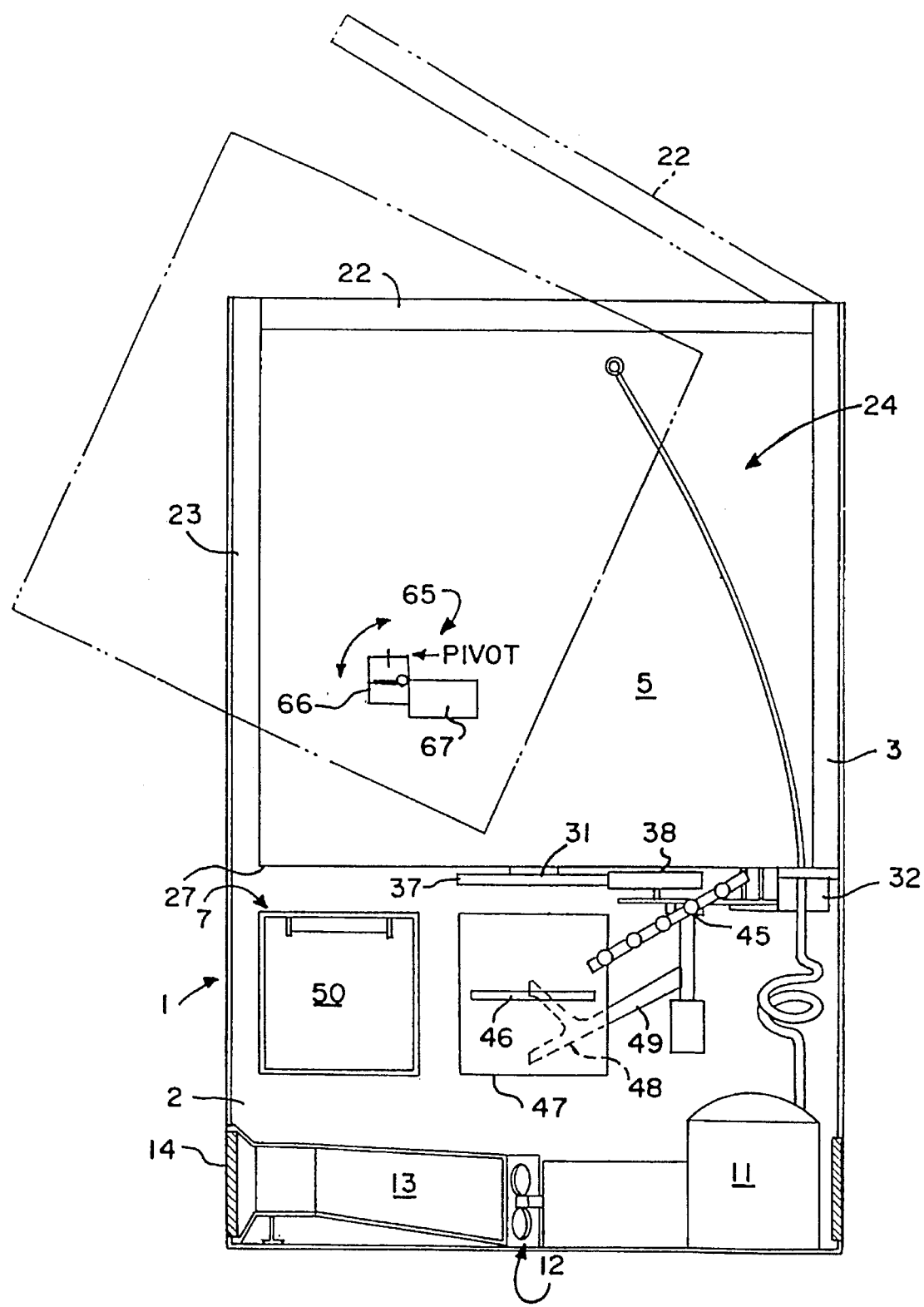
FIG. 2 is a cross-sectional view of the vending machine of the present invention, showing its internal components from the side.

FIGS. 1 and 2 provide an overall illustration of a vending machine 1 produced in accordance with the present invention. The vending machine 1 generally takes the form of a cabinet 2 disposed upon a supporting frame 3, for containing the various components needed to develop a money-actuated machine for vending specified types of food products as will be discussed more fully below.

The major components comprising the vending machine 1 include the following. A freezer 5 is provided for receiving and storing the food products to be vended, for eventual discharge responsive to operation of the vending machine 1 by a consumer. To this end, a dispensing mechanism 6 is provided for selectively dispensing food product contained within the freezer, for further processing. Dispensed food product is then delivered to a microwave oven 7 for heating and/or cooking (while microwave cooking is presently preferred, other forms of rapid heating may also be employed, if desired, such as convection, infrared, or even laser heating). The cooked food product is then delivered to the consumer at an appropriate discharge point 8. These major components of the vending machine 1 cooperate to deliver an originally frozen, and subsequently cooked food product to a consumer, as follows.

The freezer 5 generally takes the form of an enclosure 10 which is cooled in otherwise conventional fashion by a condenser/compressor unit 11 which is advantageously located within the base of the cabinet 2 which forms the vending machine 1. For ease in servicing, the condenser/compressor unit 11 is preferably a closed cycle, sealed unit type which incorporates a condenser fan 12 for drawing air across the condenser of the condenser/compressor unit 11, for eventual discharge through a conduit 13. A filter 14 is preferably fitted over the exit of the conduit 13, which again corresponds to generally recognized practices for refrigeration units of this general type.

The condenser/compressor unit 11 communicates with a series of cooling coils 15 which are housed within the enclosure 10 of the freezer 5. To this end, the enclosure 10 is defined by an outer wall 16 and an inner wall 17 which are separated by a suitable insulation material 18 such as molded polystyrene. The cooling coils 15 are embedded within the insulation material 18 to develop the refrigeration necessary to maintain food product contained within the freezer 5 at its desired temperature. To this end, the cooling coils 15 are preferably positioned to make direct contact with the inner wall 17 of the enclosure 10 of the freezer 5, to cool the interior of the enclosure 10 by convection through the inner liner, and in turn cooling the food products stored within the freezer 5 by radiation. This arrangement has been found to be important in avoiding the formation of frost or ice within the unit, which might tend to foul the product delivery system and/or cause the packaged food products to stick to one another. It has been found that a freezer construction of this general type is satisfactory in maintaining food product to temperatures as low as 20° F. (minimum), which is effective for the proper storage of food products over a relatively extended period of time.

As will be discussed more fully below, a variety of measures are taken to monitor the condition of the various components comprising the vending machine 1 of the present invention, since the vending machine 1 is intended for stand-alone use. One such device takes the form of a monitor 20 (e.g., a thermocouple) for determining the temperature within the enclosure 10 of the freezer 5. The monitor 20 in turn preferably communicates with a strip recorder 21, which can be activated in the event that the refrigerator 5 elevates to an unacceptably high temperature (e.g., preferably on the order of 20° F.). From this point forward, the strip recorder 21 operates to record times and temperatures subsequent to the event which initiated its operation to ensure that the food product which is contained within the freezer 5 does not reach a temperature that would thaw the food product and jeopardize its quality. If so, steps would then be taken to replace the spoiled food product, for purposes of consumer safety.

The freezer 5 preferably incorporates a tilting mechanism 65 which facilitates loading of the freezer 5 with food product. This generally takes the form of appropriate linkages 66 interconnecting the enclosure 10 of the freezer 5 with the frame 3 of the vending machine 1 so that the freezer 5 can be titled from its normal upright position to the tilted position which is shown in phantom in FIG. 2. Such tilting can be accomplished either mechanically, or responsive to an electric motor 67 associated with the linkages 66. Depending upon the size (primarily the height) of the freezer 5, it may in some cases also be necessary to tilt back the top 22 of the cabinet 2 as the freezer 5 is tilted outwardly. Operation of the tilting mechanism 65 preferably causes a lock-out mechanism (e.g., a contact switch or the like) to disable other systems associated with the vending machine 1 so that accidental operation of the various subsystems of the vending machine 1 is precluded during servicing of the unit.

As will be discussed more fully below, the vending machine 1 of the present invention is particularly well suited to the dispensing of dough-based food products such as pizza and the like, and the freezer 5 of the vending machine 1 is therefore preferably configured to best accommodate food products of this general type. To this end, the top for the enclosure 10 is formed of the same general construction as the cylindrical shell 23 which forms the enclosure 10, and is removable from the cylindrical shell 23 for gaining access to the interior of the freezer 5, and the interior cavity 24 of the freezer 5 is configured to house a plurality of generally vertically oriented storage magazines 25, as follows.

Figure 3:
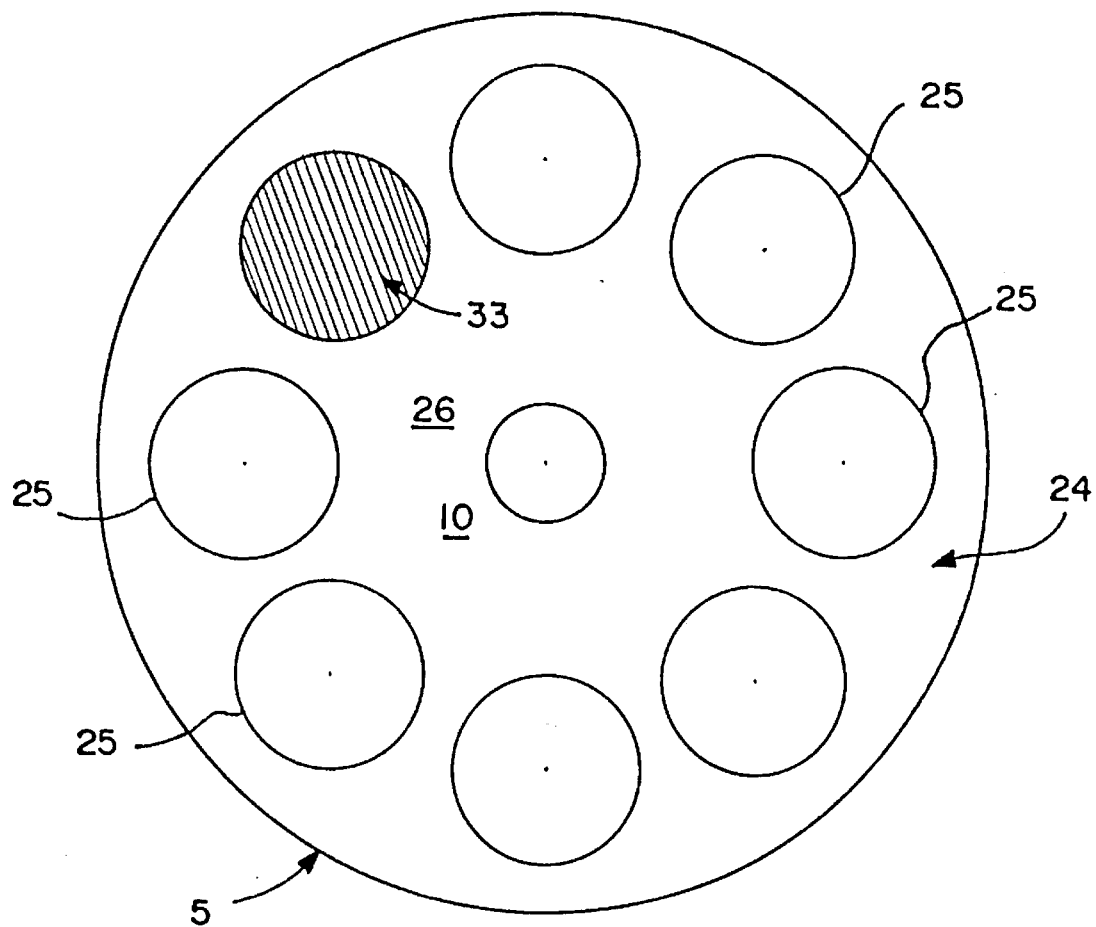
FIG. 3 is a sectional view of the freezer of the vending machine, taken along line 3—3 of FIG. 1.

Referring now to FIG. 3, the storage magazines 25 are preferably oriented so that a maximum number of storage magazines 25 may be placed within the limited confines of the enclosure 10 of the freezer 5. In the embodiment shown, each storage magazine 25 is generally tubular in construction, preferably formed of thin aluminum stock (or equivalent) and having a diameter which is appropriate for receiving the food products which are to be dispensed. Support for the vertically oriented magazines 25 is provided by a series of header plates 26, which further assist in centering the assembly of storage magazines 25 within the confines of the enclosure 10 of the freezer 5. In this fashion, the assembled unit is held stationary within the cavity 24 of the freezer 5, assisting in maintaining a proper and fixed alignment of the storage magazines 25 (which could otherwise be jeopardized by the moving parts of the dispensing mechanism 6 which is used to withdraw food product from the storage magazines 25 of the freezer 5).

The diameter of each storage magazine 25 is preferably selected so that the packaged, frozen food product which is to be contained is snugly received in a stacked form which is arranged geometrically and regularly to maximize the amount of food product which can be contained within the freezer 5, while further facilitating the dispensing function which is to follow. For example, as previously indicated, the vending machine 1 herein described is primarily configured for vending pizza food products. For vending food products of this type, the storage magazines 25 of the freezer 5 are preferably configured as cylindrical tubes having a diameter closely configured to the containers which receive the pizzas which are to be dispensed. For example, in dispensing a 7 inch (individual serving) pizza, cylindrical tubes having a diameter of approximately 7.125 inches would be appropriate. The length of the tube, and accordingly the height of the column of containers developed, will determine the number of pizzas which can be stored within the unit, and will depend upon the weight which can be effectively supported by the lowermost containers forming the column. Lengths on the order of 28 inches are appropriate for this purpose, with shorter lengths tending to reduce the capacity of the unit, and with longer lengths tending to create too much weight upon the lowermost containers in the stack which is developed. For a vending machine 1 incorporating storage magazines 25 of this general size, it is been found that seven storage magazines 25 may be advantageously contained within a single enclosure 10. This will, of course, depend upon the size of the vending machine, and the nature of the food products which are to be dispensed.

The bottom 27 of the freezer 5 incorporates the dispensing mechanism 6, which serves to dispense food product contained within the storage magazines 25 of the freezer 5 for further processing. The dispenser mechanism 6 primarily operates responsive to a selector disk 30. The selector disk 30 is mounted upon a rotatable actuator shaft 31, which is in turn operable responsive to a motor 32.

Figure 4:
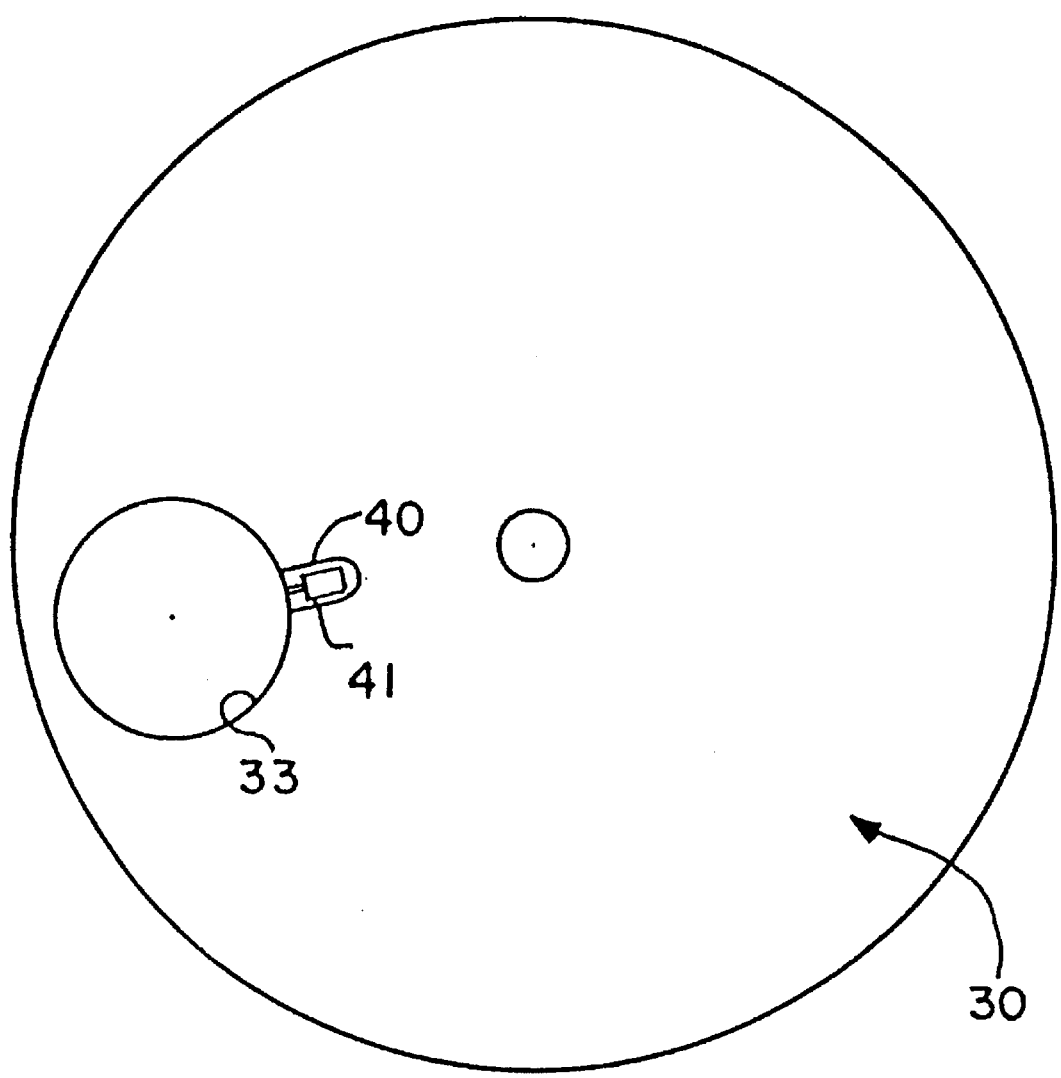
FIG. 4 is a top plan view of the selector disk of the vending machine's dispensing mechanism.

Referring now to FIGS. 4 and 5, the selector disk 30 generally takes the form of a disk provided with a single carrier hole 33 having a diameter and thickness adapted to rather closely receive food product (in its container) from the storage magazines 25 of the freezer 5. The carrier hole 33 of the selector disk 30 is rotatable responsive to operation of the motor 32 to selectively move the carrier hole 33 from a neutral position (FIG. 5A) to a position beneath a desired storage magazine 25 of the freezer 5 (FIG. 5B), and to then move the food product received from the addressed storage magazine 25 to a discharge opening 35 formed in the base 27 of the enclosure 10 of the freezer 5 (FIG. 5C). In this fashion, food product can be selectively dispensed from the several storage magazines 25, exiting at the discharge opening 35.

Such movement of the selector disk 30 is advantageously electronically controlled (clockwise or counter-clockwise rotation) making use of a DC motor 32 coupled with an octagonal gear 37 which operates as a Geneva movement, responsive to a toothed belt 38 connecting the octagonal gear 37 with the DC motor 32. Such controls are generally known and therefore need not be described in further detail.

Figure 10:
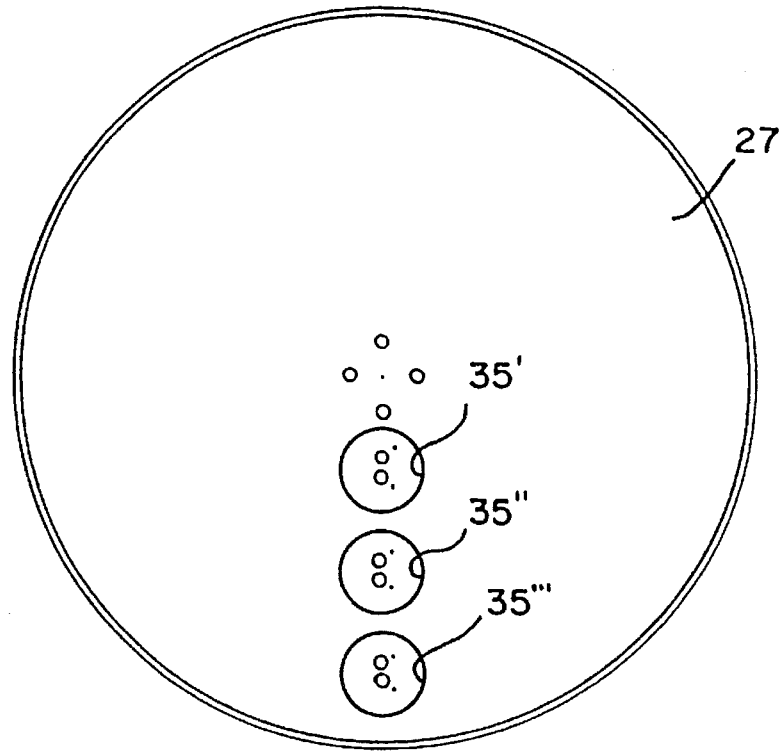
FIG. 10 is a bottom plan view of the freezer of FIG. 7, showing the discharge openings.
Figure 11:
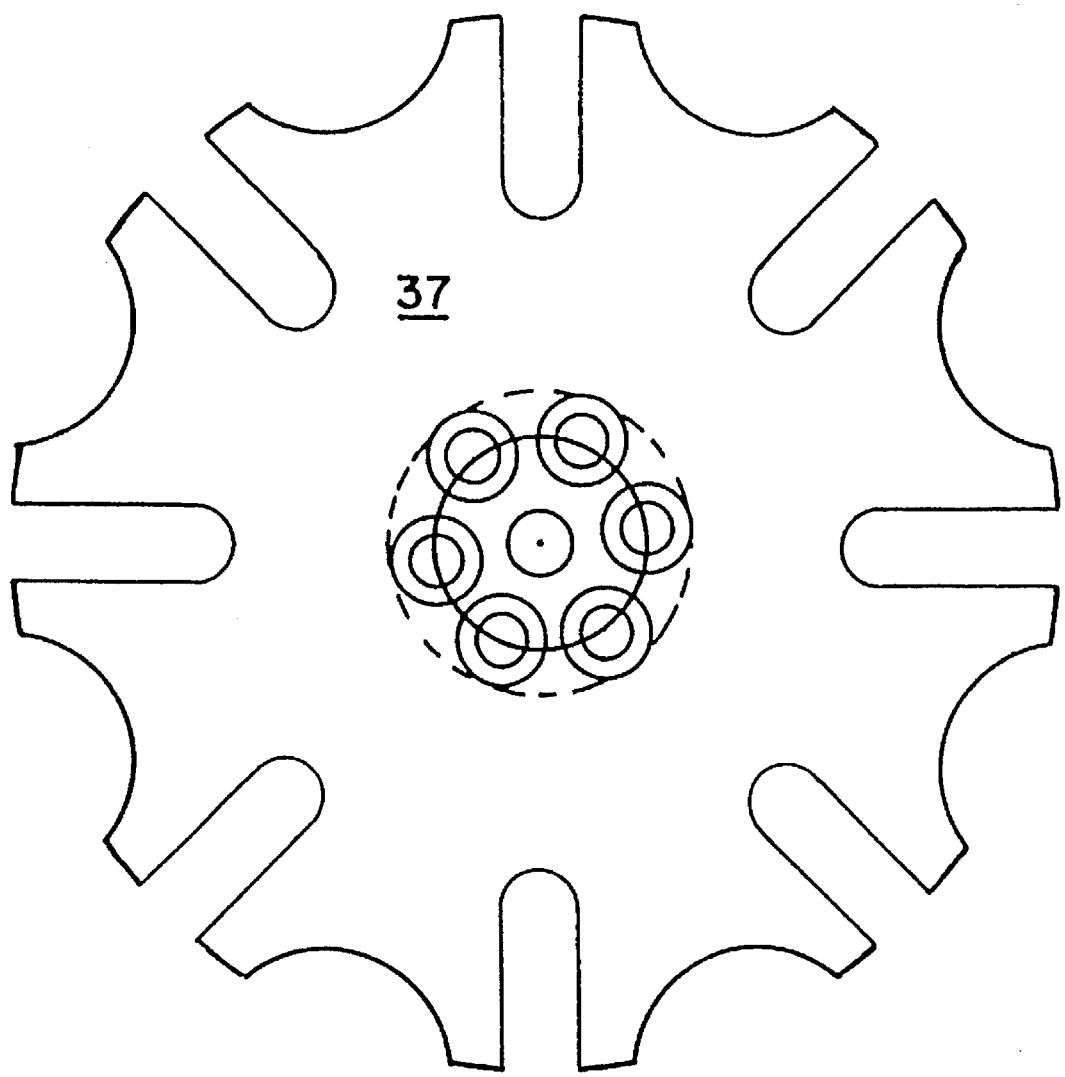
FIG. 11 is a plan view of a Geneva mechanism for operating the dispensing mechanism associated with the freezer of the vending machine.
Figure 12:
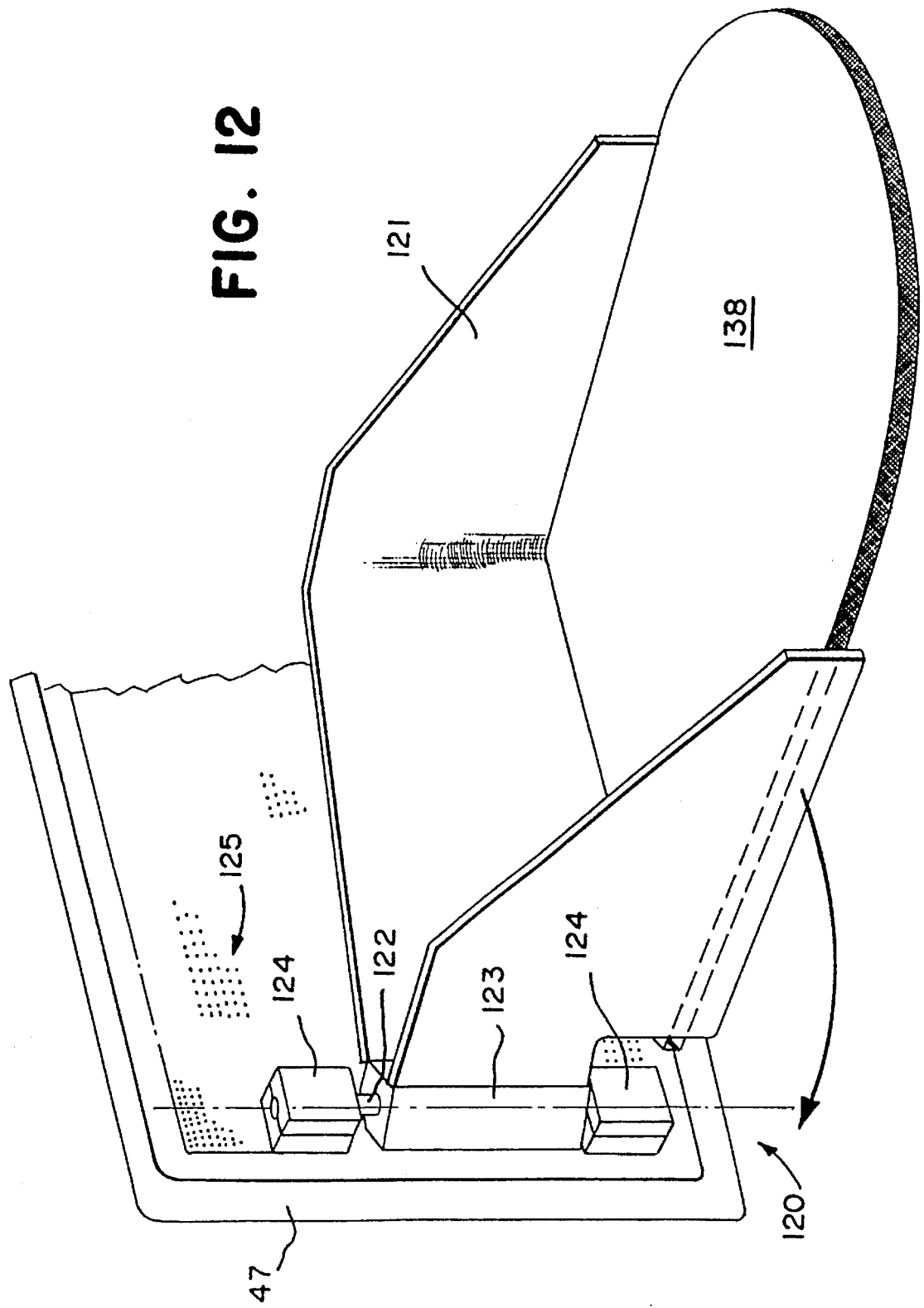
FIG. 12 is a perspective view of an alternative embodiment delivery mechanism for the vending machine.
Figure 13:
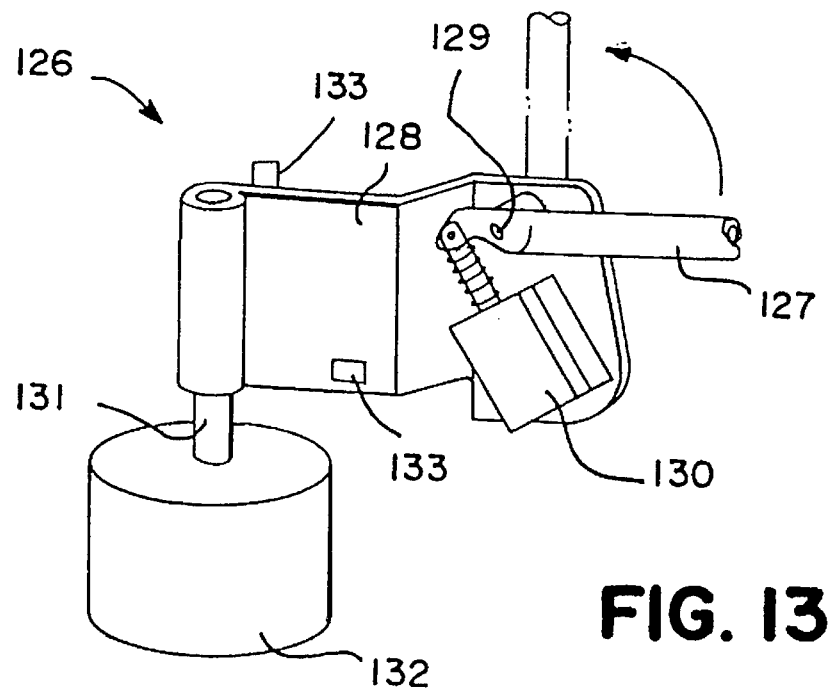
FIG. 13 is a perspective view of a drive mechanism for use with the delivery mechanism of FIG. 12.
Figure 14:
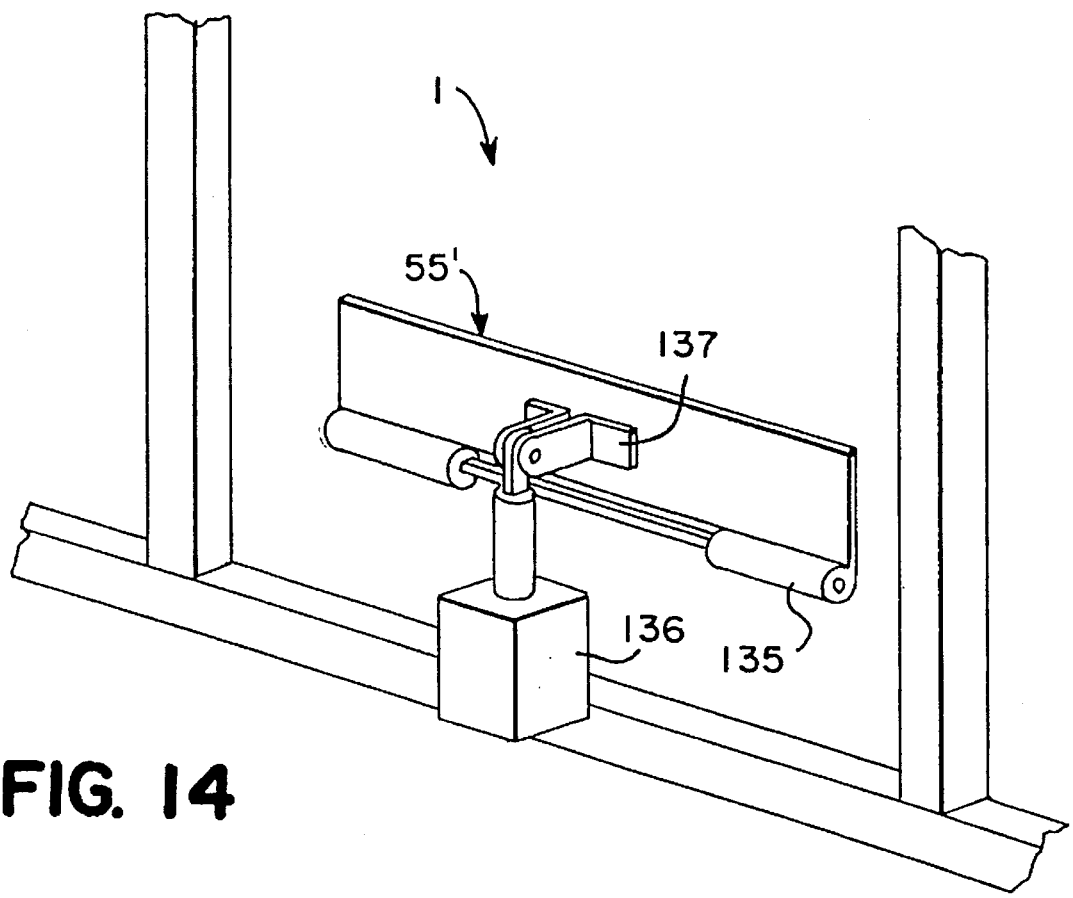
FIG. 14 is a perspective view of a delivery door for use with the delivery mechanism of FIG. 12.

A Geneva movement is preferably used to precisely position the selector disk 30 beneath the storage magazine 25 which is to be addressed, although other means (e.g., servomotors or the like) could be used if desired. While Geneva mechanisms of this general type are known, the Geneva mechanism of the present invention is improved by altering the engagement of the drive gear pin with the driven Geneva gear, as shown in FIG. 10. As illustrated, the lead-in and gentle tail-out of the engagement cycle is modified, which has proven to be beneficial to the smoothness of operation of the drive, as well as establishing the proper dwell sequence necessary to allow the food product to drop into the carrier hole 33 of the selector disk 30, while providing a greater mechanical advantage by allowing a more direct pressure to be applied at a greater angle on the gear faces. This modification causes a figure "8" movement in the Geneva drive, as compared to the generally utilized figure "V" movement, which proves to be more efficient in operation.

Preferably associated with the carrier hole 33 of the selector disk 30 are an optical sensor 40 and a mass sensor 41 for assisting in the dispensing of food product from the freezer 5. These sensors operate to detect food product (containers) which have been transferred from the addressed (selected) storage magazine 25 to the selector disk 30 of the dispenser mechanism 6. This event initiates further operation of the dispenser mechanism 6, namely rotation of the selector disk 30 to the discharge opening 35.

Important to note is the simplicity of the dispenser mechanism, which is primarily a gravity-type system. Also important to note is that by providing different types of food products within the different storage magazines 25 of the freezer 5, the dispenser mechanism 6 not only permits the dispensing of food products from the freezer 5, one at a time, but also permits a selection between different types of food products by controlling the direction of rotation of the selector disk 30 (e.g., clockwise for one type of food product, counter-clockwise for another).

It is clearly important to properly maintain the temperature within the cavity 24 of the freezer 5 while food product is being dispensed. Two structures cooperate to provide this result. First, a certain degree of isolation will result from the generally solid selector disk 30, in cooperation with the insulated bottom 27 of the enclosure 10 for the freezer 5. Second, a freezer door 42 is preferably fitted to the bottom 27 of the enclosure 10, which covers the discharge opening 35 of the enclosure 10 when a food product dispensing operation is not in progress.

As shown in FIG. 5A, the freezer door 42 is slidingly disposed beneath the discharge opening 35 and is selectively opened by an actuator mechanism 43 when food product is to be dispensed from the freezer 5. The carrier hole 33 is preferably positioned over the discharge opening 35 prior to opening the freezer door 42 so that the selector disk 30 operates to isolate the cavity 24 of the freezer 5 when the freezer door 42 is opened by the actuator mechanism 43. Following this, the dispensed food product is dropped from the discharge opening 35, passing the freezer door 42, under the influence of gravity. The dispensed food product then drops to a delivery roller system 45 which, in turn, guides the dispensed food product toward the microwave oven 7, for heating.

Figure 6:
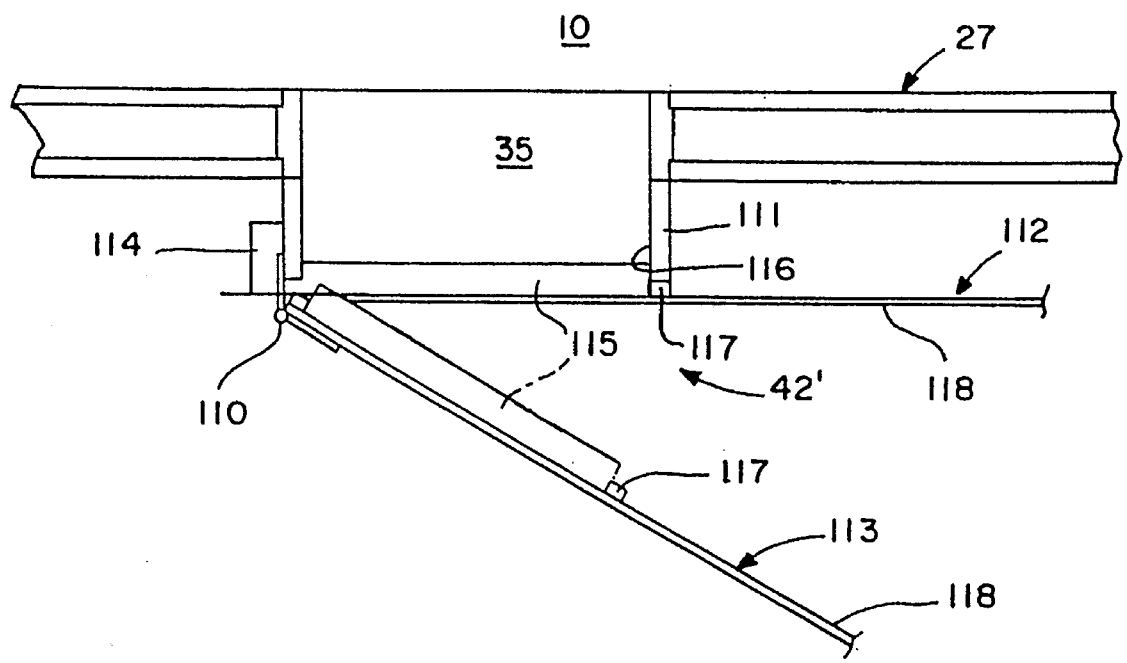
FIG. 6 is a side elevational view of an alternative embodiment freezer door for the vending machine.
Figure 7:
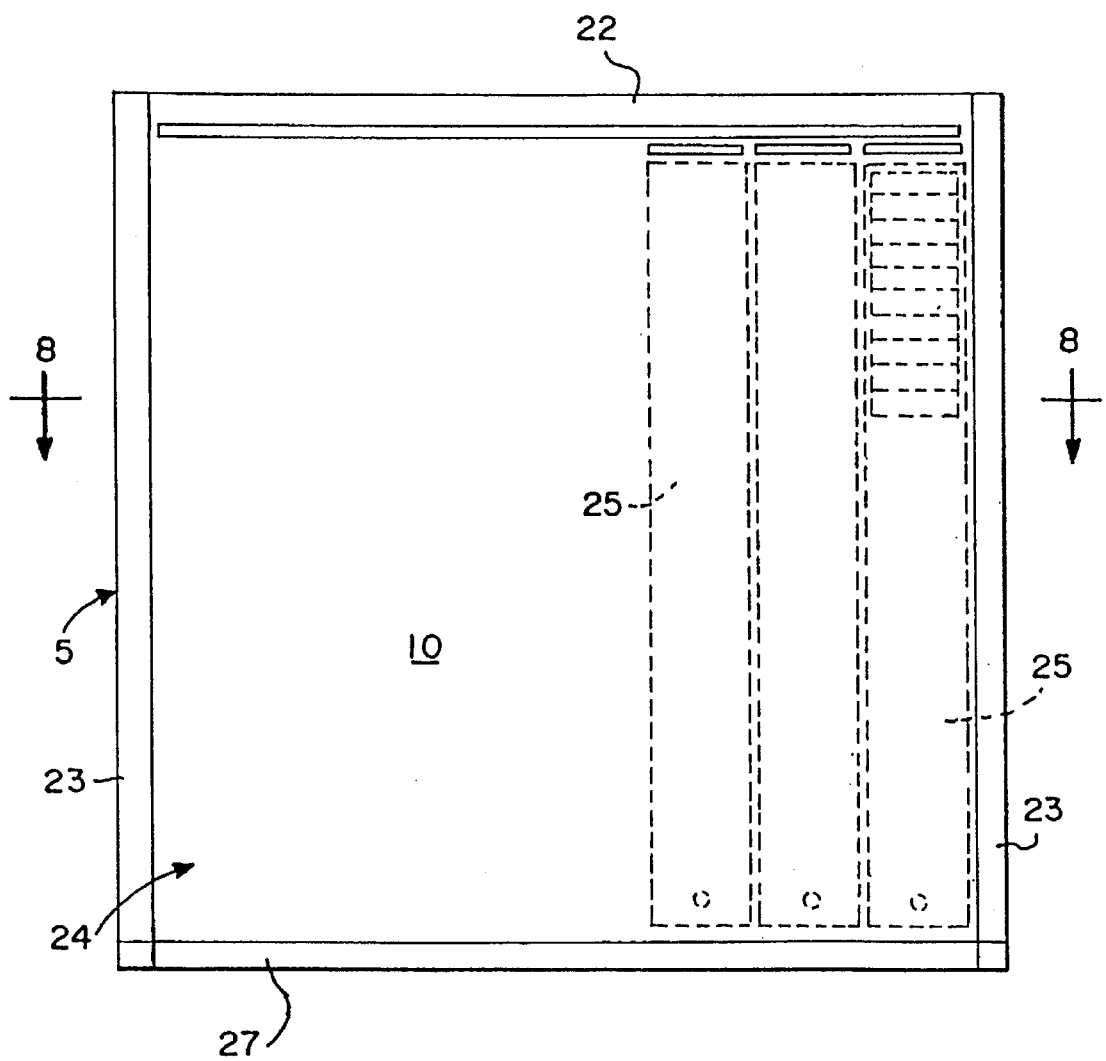
FIG. 7 is partial, sectional view of an alternative embodiment freezer for the vending machine.
Figure 8:
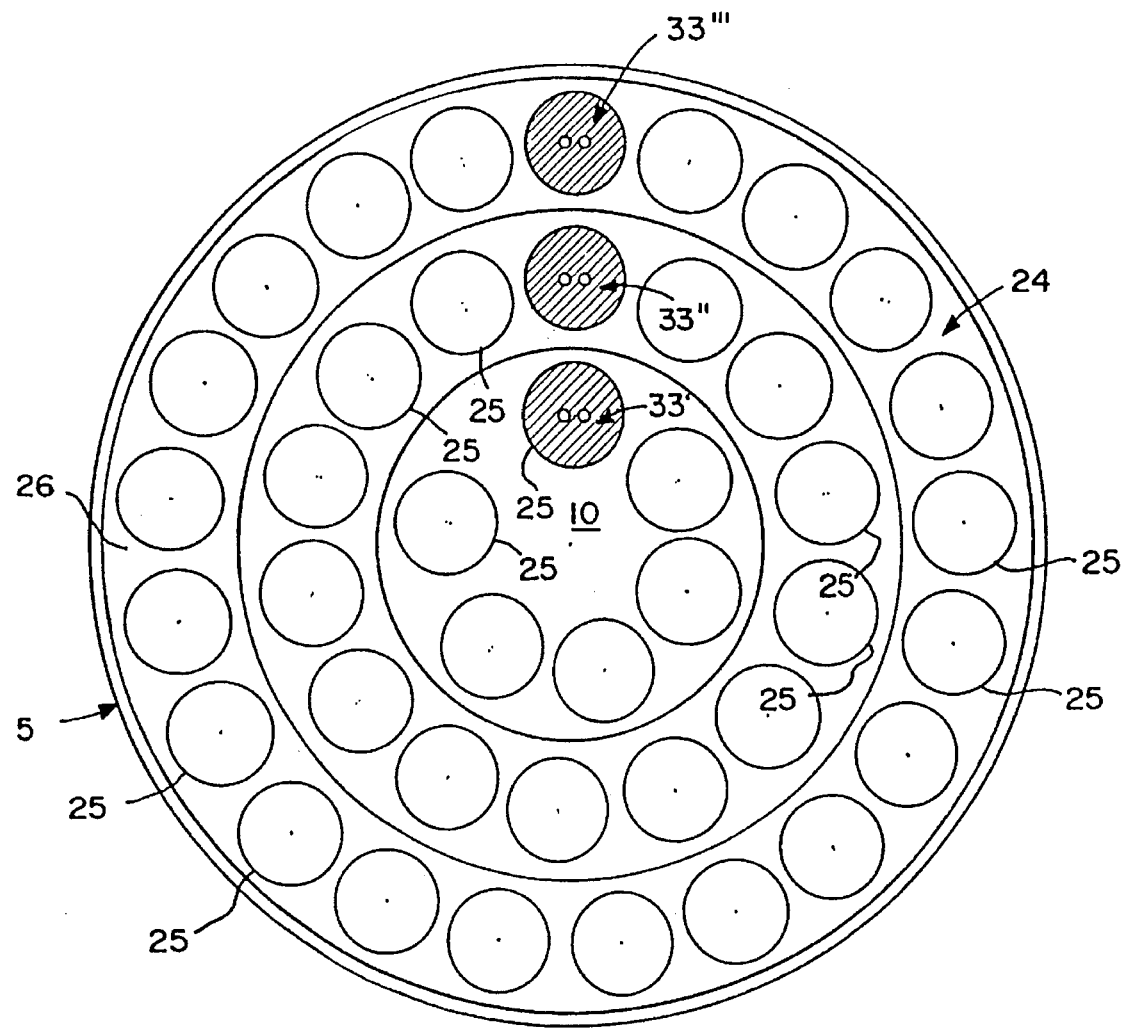
FIG. 8 is a sectional view of the freezer of FIG. 7, taken along line 8—8.

As shown in FIG. 6, an alternative embodiment freezer door 42' may be similarly employed to selectively dispense food product from the discharge opening 35, if desired. The freezer door 42' is received by a collar 111 associated with the bottom 27 of the enclosure 10. A pair of hinges 110 permit the freezer door 42' to drop from a first position 112 which encloses the discharge opening 35 to a second position 113 which permits the food product to drop from the discharge opening 35 of the freezer 5, as desired, responsive to a solenoid or motor drive (at 114). A disk 115 is mounted for rotation upon the freezer door 42', and fits into the opening 116 which is defined by the collar 111 to effectively seal the discharge opening 35. To this end, the disk 115 is preferably formed of a rigid plastic, and a strip 117 of compliant sealing material is preferably positioned along the perimeter of the disk 115 to better ensure an effective seal at this interface. Rotation of the disk 115 is permitted to facilitate this sealing process. The freezer door 42' extends into a chute 118 for guiding the dispensed food product toward the microwave oven 7, similar to the delivery roller system 45 associated with the freezer door 42 of FIG. 5A.

FIGS. 5A, 5B and 5C illustrate a preferred embodiment dispenser mechanism 6, and its manner of operation. As illustrated, the dispenser mechanism 6 is generally comprised of three cooperating layers including the lowermost header plate 26 supporting the assembly of storage magazines 25, the selector disk 30, and the bottom 27 of the enclosure 10 for the freezer 5. As previously indicated, to dispense a food product the carrier hole 33 of the selector disk 30 is first moved from its neutral position over the discharge opening 35 (FIG. 5A) to a selected storage magazine 25. This proceeds until the carrier hole 33 of the selector disk 30 is positioned beneath the desired storage magazine 25 (FIG. 5B), whereupon food product (a container) drops into the carrier hole 33 (under the influence of gravity), resting upon the bottom 27 of the enclosure 10. In the event that the carrier hole 33 of the selector disk 30 addresses a storage magazine 25 which has been emptied, preferred operation is for the carrier hole 33 of the selector disk 30 to continue on to the next storage magazine 25, receiving a food product container for further processing.

Since the thickness of the selector disk 30 is set to generally correspond to the height of the food product to be dispensed (e.g., about ¾ of an inch for a pizza), continued movement of the selector disk 30 operates to draw the selected food product container along the cavity 44 which is developed between the header plate 26 and the bottom 27 of the enclosure 10, while remaining food product containers housed within the storage magazine 25 rests upon the otherwise solid selector disk 30. To be noted is that such actuation develops a shearing action capable of separating even containers which have been frozen together. The selected (isolated) food product container is then brought back to the discharge opening formed in the bottom 27 of the enclosure 10, permitting the selected food product container to drop from the carrier hole 33 and into the discharge opening 35 under the influence of gravity. The freezer door 42 (or 42') is opened to discharge the selected food product container as previously described. To be noted is that different types of food products may be selected by filling different storage magazines 25 with different types of food products, and by selectively rotating the selector disk 30 either clockwise or counter-clockwise responsive to the particular product which has been selected by the consumer.

FIGS. 7 to 10 show an alternative embodiment dispensing mechanism 6' which can be used to dispense an increased number of different types of food products from a single vending machine 1. In this embodiment, and referring to FIGS. 6 and 7, plural series of storage magazines 25 are positioned to develop annular groupings capable of receiving different types of food products. To this end, each annular grouping of storage magazines can be provided with either a single type of food product, or different types (responsive to clockwise and counter-clockwise rotations of the selector disk), as desired.

Figure 9:
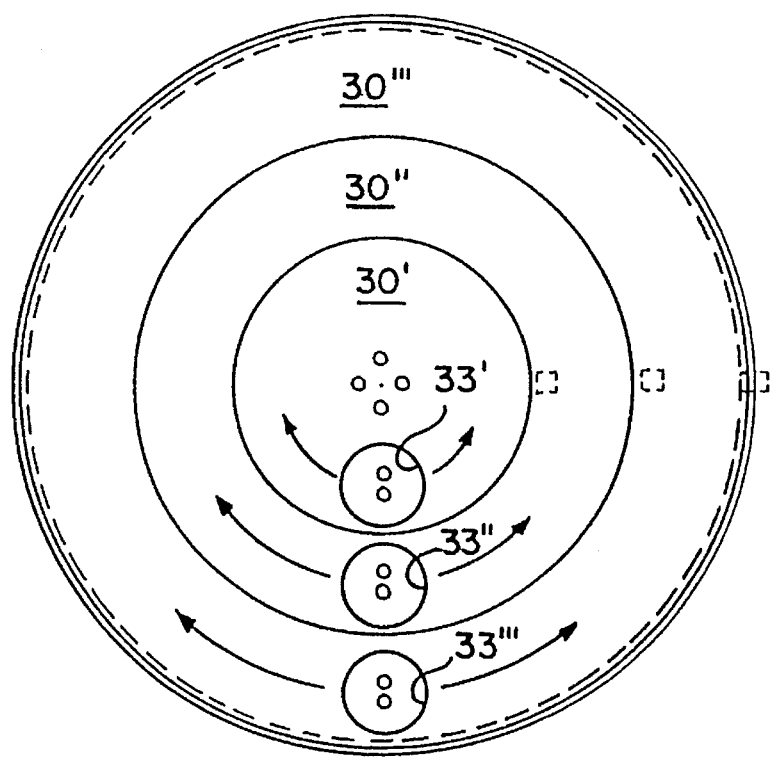
FIG. 9 is top plan view of the selector disk assembly for the freezer shown in FIG. 7.

Cooperating with this configuration of storage magazines is a dispenser mechanism 6' which, as shown in FIG. 9, is comprised of three concentrically disposed selector disks 30', 30", 30"' which are adapted for rotational movement beneath the annular groupings of storage magazines 25 which are provided. Associated with the selector disks 30', 30", 30"' are a corresponding series of discharge openings 35', 35", 35"', as shown in FIG. 10. Operation of the dispenser mechanism 6' proceeds substantially similarly to the operation of the dispenser mechanism 6, with selective rotations of the selector disks 30', 30", 30"' operating to select food product from the various storage magazines 25 which are provided. To be noted is that such movements can result in the selection of a single food product responsive to the rotation of only one of the selector disks which are provided, or a selection of multiple food products responsive to the rotation of multiple selector disks should this be desired. In any event, selected food product is delivered from the appropriate discharge openings 35', 35", 35"', dropping to the delivery roller system 45 (which is oriented to pass beneath each of the several discharge openings which are provided).

To be noted is that while three concentric selector disks are shown in this illustrative embodiment, other numbers are also possible provided that the number of storage magazines and the number of discharge openings are correspondingly modified. In any event, a maximum amount of product is made storable within the freezer 5 due to the efficient stacking configuration of the storage magazines 25, and the simplicity of the associated dispensing mechanism. To be noted is that while considered less desirable, similar freezer storage and dispensing mechanisms may be developed for products having other shapes, such as squares or triangles. However, a circular configuration is preferred since the mechanisms involved tend to be less subject to jamming.

Referring again to FIGS. 1 and 2, frozen food product is received from the delivery roller system 45 upon a transporter tray 46 associated with the door 47 of the microwave oven 7. The transporter tray 46 and door 47 are retained in position by an arm 48 and associated actuator shaft 49 which combine to move the transporter tray 46 and door 47 from a rest position beneath the delivery roller system 45 to an operative position in which the transporter tray 46 is received within the cavity 50 of the microwave oven 7, which is simultaneously enclosed by the door 47. Operation of the actuator shaft 49 is advantageously accomplished responsive to a DC motor 51. The DC motor 51 is preferably operated responsive to an optical sensor 52 which is positioned to detect when food product has been received from the delivery roller system 45, and placed upon the transporter tray 46.

In addition to causing movement of the transporter tray 46 toward the microwave oven 7, and closing the door 47 behind it, the detection of food product by the optical sensor 52 is also used to start a timer for operating the microwave oven 7, and to close the freezer door 42. The timer operates to allow for variable heating and/or cooking within the microwave oven 7, as will be discussed more fully below. Following cooking, the timer is stopped and a signal is provided which operates the motor 51, withdrawing the door 47 and transporter tray 46 from the microwave oven 7, and bringing the cooked food product to the discharge point 8. This electrical signal is also preferably used to reset the vending apparatus previously described, for another vending cycle.

To be noted is that the transporter tray 46 can also be used to facilitate the cooking process, if desired. An important feature of the vending machine 1 of the present invention is its ability to take frozen, precooked and prepackaged food products from their stored (frozen) condition to a fully cooked condition in a short period of time. A variety of improvements are combined in order to achieve this result, and will be discussed more fully below. The transporter tray 46 can also be used to facilitating this process, and is therefore preferably formed of polished aluminum having a series of spaced apertures. The polished aluminum causes microwave energy to be reflected back into the food product being heated. The spaced apertures allow for emitted gases and steam resulted from the microwave cooking process to pass through the bottom of the cooking food product, avoiding the build-up of condensation which would otherwise result (and which might tend to cause the container to come apart and/or cause the food product to become wet or soggy). Apertures on the order of one thirty-second of an inch are preferred since apertures of this size will allow steam and water molecules to pass through the transporter tray, while being too small to permit microwaves to pass through the tray (resulting in their loss).

Upon retraction of the door 47 and transporter tray 46 to the rest position, the cooked food product will be stationed directly in front of the discharge point 8, making the food product available for delivery to the consumer. This is preferably accomplished by means of a vending door 55 which is only capable of being opened when prepared food product is to be dispensed, to ensure that access to the vending machine 1 is prevented at all other times to avoid tampering, and for safety in operation. Such functioning is accomplished by fitting the vending door 55 with an actuator 56 which releases the vending door 55 only upon the detection of hot food product on the (withdrawn) transporter tray 46. For example, a heat sensor 57 may be used to operate a solenoid for controlling the vending door. Other implementations are also possible. The signal from the sensor 57 is also advantageously used to provide a visual indication on the outside of the vending machine 1, advising the consumer that the food product is ready and that the vending door 55 can be opened. Once the food product is removed, the sensor 57 will no longer detect the presence of hot food product on the transporter tray 46, releasing the actuator 56 and once again locking the vending door 55 (upon its closure) to prevent further access to the interior of vending machine 1.

FIGS. 12 to 15 illustrate an alternative embodiment delivery mechanism 120 for accomplishing the above-described operations. The delivery mechanism 120 employs a pivotable transporter tray 121 for receiving a food product from the dispenser mechanism 6, and following cooking, for delivering the heated food product to the consumer. The transporter tray 121 is attached to the door 47 of the microwave oven 7 by a shaft 122 which engages a bearing 123 associated with the transporter tray, and which is received within a pair of bearing blocks 124 associated with the door 47 of the microwave oven 7.

Any of a variety of techniques may be employed for attaching the bearing blocks 124 to the door 47 of the microwave oven 7. For example, adhesives, heat, or even ultrasonic welding techniques may be used for this purpose. However, it has been found that a particularly advantageous means for accomplishing this connection is to employ a mold which permits the injection of suitable plastics for forming the bearing blocks 124, directly through the viewing holes 125 which conventionally form part of the door 47 of the microwave oven 7. Employing this technique, the material forming the bearing blocks 124 extrudes through the viewing holes 125, bonding to and creating a part of the inside of the door 47. This results in a secure mounting of the working part to the inside of the door 47, for subsequent operations which will be described below. Important to note is that this technique can be similarly employed to attach other implements to the inside of the door 47 of a microwave oven 7, if desired.

Rotation of the transporter tray 121 is controlled by a drive mechanism 126. To this end, a drive pin 127 is fixed to a frame 128, at a pivot 129, for rotation responsive to a solenoid 130. The frame 128 is, in turn, fixed to the shaft 131 of a drive motor 132. In operation, the drive pin 127 is normally retracted, assuming a generally horizontal orientation located beneath the plane of the transporter tray 121. Extension of the drive pin 127 is accomplished responsive to operations of the solenoid 130, causing the drive pin 127 to assume a generally vertical position and bringing the drive pin 127 into engagement with the transporter tray 121. Following this, rotations of the transporter tray 121 are accomplished by the motor 132, as desired. Such rotations are advantageously controlled by limit switches 133 associated with the frame 128 of the drive mechanism 126, as desired.

The delivery mechanism 120 operates in conjunction with a modified vending door 55' which is generally horizontally oriented, and which is connected to the frame of the vending machine 1 by a pivot 135 which preferably extends along the bottom of the vending door 55'. A solenoid 136 engages a frame 137 attached to the inside of the vending door 55', so that operations of the solenoid 136 can open the vending door 55' when a heated food product is to be dispensed.

Figure 15:
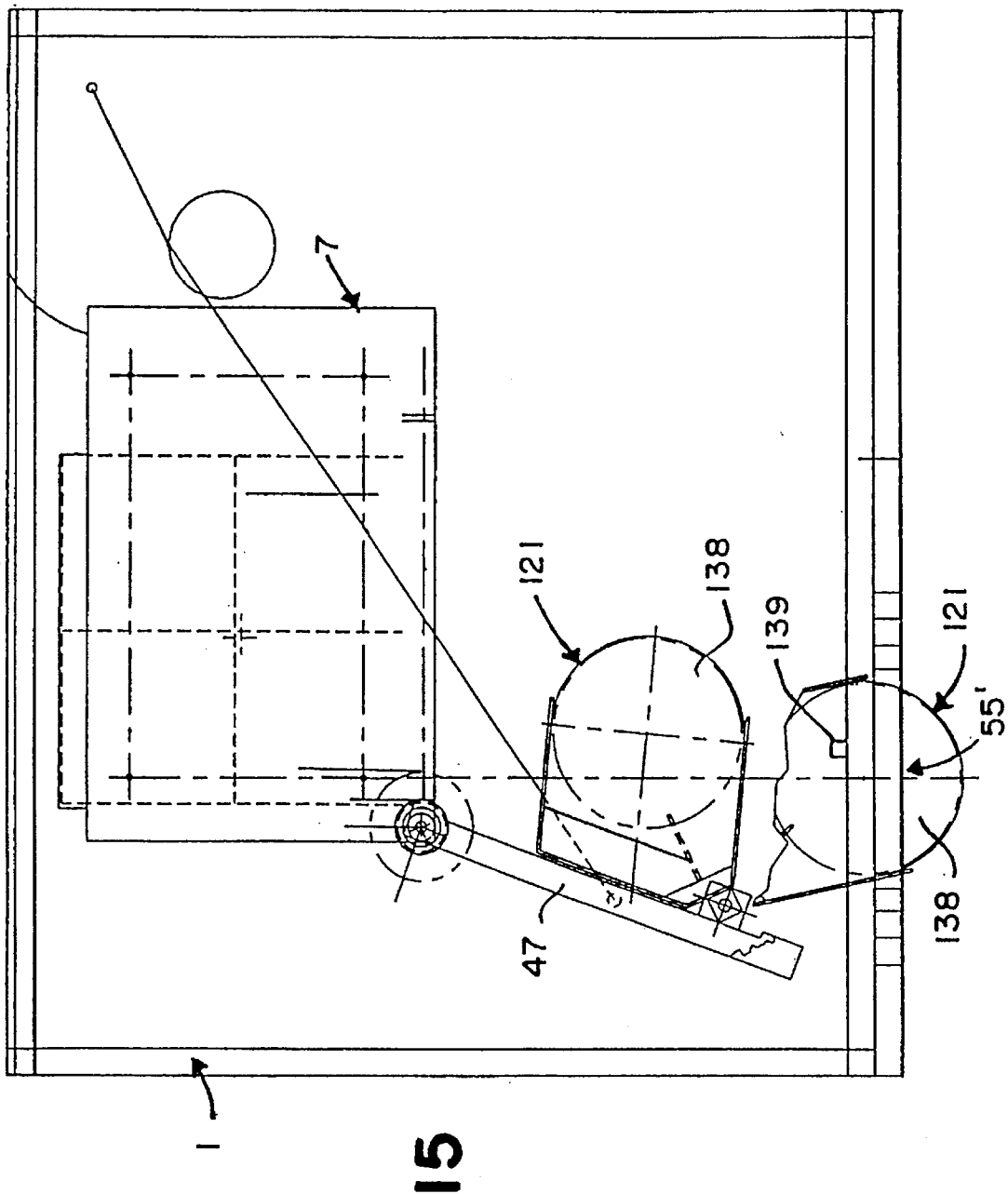
FIG. 15 is a schematic plan view showing operation of the delivery mechanism shown in FIGS. 12 to 14.

Referring now to FIG. 15, operations of the delivery mechanism 120 proceed as follows. A selected food product dispensed from the discharge opening 35 will be received either by the delivery roller system 45 of FIG. 5A, or the chute 118 of FIG. 6. In either case, this dispensed food product will then be introduced onto the receiving surface 138 of the transporter tray 121 (the door 47 of the microwave oven 7 will then be in its opened position and the transporter tray 121 will be retracted against the door 47). Following this, the door 47 of the microwave oven 7 is closed, and the food product is heated as desired.

After heating, steps are then taken to deliver the cooked food product to the consumer. To this end, the door 47 of the microwave oven 7 is opened and the delivery mechanism 120 is employed by activating the solenoid 136 to open the vending door 55', and by activating the solenoid 130 to engage the transporter tray 121. Following such engagement, the motor 132 is used to swing the transporter tray 121 from its position against the door 47 of the microwave oven 7, outwardly through the vending door 55', which is then open. This, in essence, operates to deliver the cooked food product directly to the consumer, avoiding the need for the consumer to have to reach into the vending machine 1 for purposes of obtaining the heated food product.

A photosensor 139 is preferably mounted above the transporter tray 121, adjacent to the vending door 55', to detect removal of the food product from the surface 138 (following delivery to the consumer). This then provides an electrical signal for returning the delivery mechanism 120 to its initial position, and for closing the vending door 55' to prevent access to interior portions of the vending machine 1. Such movements may be controlled by the limit switches 133 associated with the delivery mechanism 120, or if desired, through servomotors and microprocessor controls.

The foregoing provides a structural and functional overview of the vending machine 1 of the present invention. However, many of the basic structural features previously described incorporate additional improvements which further facilitate the functioning of the vending machine 1.

For example, it will be understood that the various interactive functions of the vending machine 1 of the present invention may be implemented by fixed logic circuitry, if desired. However, it is preferable to implement these control functions within a suitable microprocessor 150 in view of the added flexibility which this affords. This further has the advantage that in addition to providing the control functions which are required, additional (optional) system functions are advantageously performed. This can include various warning signals, additional functions assisting in securing payment for the food product which is to be dispensed, as well as interactive communications for assisting in servicing of the vending machine 1.

Figure 26:
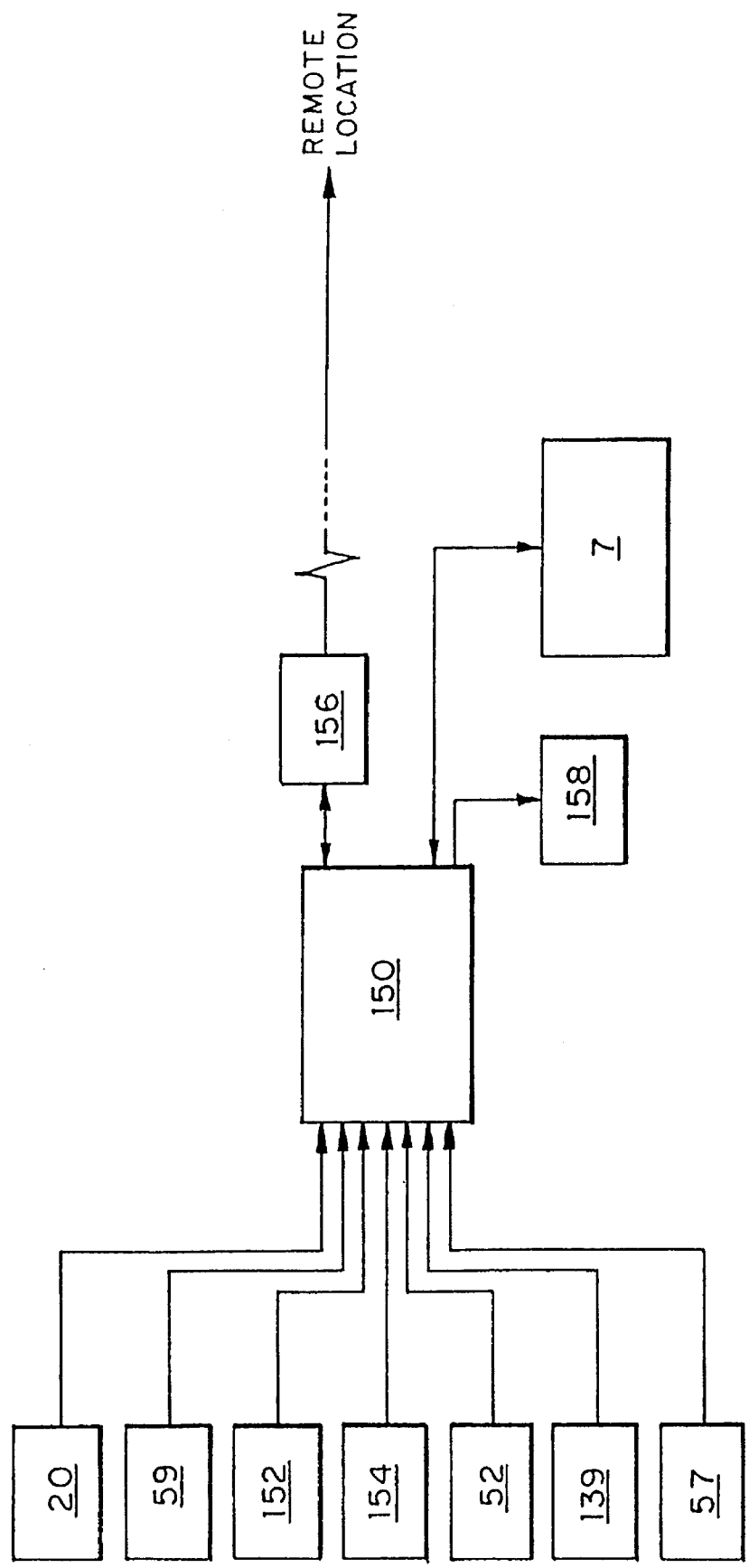
FIG. 26 is a flow diagram for the operation of the vending machine 1.

As shown in FIG. 26, which provides a flow diagram for signals to the microprocessor 150, one such feature is the previously described monitor or thermocouple 20 associated with the freezer 5 of the vending machine 1, for detecting power interruptions and potential product spoilage. Yet another desirable feature is to provide the vending machine 1 with tamper resistant alarms. This may include contact switches 152 for detecting unauthorized access to the vending machine 1, including access through the vending door 55. This may also include an alarm signal received from an anti-tipping device 59 associated with the cabinet 2 of the vending machine 1 which incorporates an appropriate mechanism (itself known) for determining if the vending machine 1 has been tipped or even kicked.

As to the manner of payment for vended food product, the vending machine 1 is advantageously provided with a control panel 60 for receiving coins and/or paper currency in generally known fashion. However, if desired, it is also possible to incorporate a credit/debit card payment system 154 (shown in FIG. 26) into the control panel 60, so that food product may be paid for using prevailing credit/debit cards rather than requiring the use of cash. Such transactions are advantageously accomplished with the assistance of the system's microprocessor 150, in conjunction with an appropriate telephone modem 156 or the like, to enable communications with a remote location for monitoring debit/credit card transactions of this type.

The telephone modem 156 also permits the vending machine 1 to be contacted from a remote location, to facilitate various servicing functions. Thus, in addition to the transmission of alarms as previously described, diagnostic operations such as monitoring time and temperature data from the monitor or thermocouple 20 for potential product spoilage as noted above may be performed, and desired statistical information or data may be obtained. The availability of two-way communications both enables monitoring functions for the various signals or data from the above-noted sensors and credit/debit card payment system 154 associated with the vending machine to be transmitted to a remote location, and for the remote location to poll specified functions of the vending machine 1, as desired.

Yet another feature which is advantageously performed by the microprocessor of the vending machine 1 is the ability to advise the consumer as to the status of the food product which is being prepared. This not only has certain utility in advising the consumer of the status of the food product which is being prepared, but also assists in occupying the consumer for the period time which is otherwise required to heat the food product. Preferably, this takes the form of a progressive graphic display 158 for illuminating front portions of the cabinet 2 of the vending machine 1, showing a sequence or progression of lighted patterns representing the various stages of the dispensing and cooking process, in turn advising the consumer of the status of the product which is being prepared. Other displays are also possible, ranging from simple indicator lights to more complicated message-indicating graphical and/or audible displays.

To accomplish the cooking procedure which is desired, the following considerations must be accommodated. First, microwave energy of sufficient power must be applied to the cavity 24 of the microwave oven, and effectively directed to the required "target" (i.e., area to be cooked). Second, the food product must be capable of accepting the amount of microwave energy which is developed without causing damage to the food product, and without compromising its quality. Third, steps must be taken to provide a container for the food product which is sufficiently air tight to prevent freezer burn, yet which will withstand (if not promote) the conditions developed within the microwave oven, which will not contaminate the food product, and which will allow gases (steam) to escape from the container during the cooking process. To this end, a container is needed which will not burst during the cooking process, yet which will retain sufficient steam to facilitate the microwave cooking process (which is dependent upon the excitation of water molecules responsive to microwave oscillation). These potentially conflicting objectives are met by three separate improvements made to the microwave oven 7, the dough formulation for the food product which is to be prepared, and the container for the food product, respectively.

To provide the heating capacity which is required to heat the desired food product within the limited time available, the microwave oven 7 incorporates several improvements. For example, while the majority of the components of the microwave oven 7 correspond to conventionally available units, steps are taken to increase the power of the unit, preferably to 1,200 to 1,600 watts, by providing a magnetron gun of increased capacity. A larger magnetron cooling fan should also be provided to accommodate the larger output of the magnetron gun. This has been found to be sufficient to cook the selected and dispensed food product in the amount of time which is desired for such purposes.

However, it is additionally possible, if desired, to replace the conventional electromagnetic wave guide with a directionally variable electromagnetic wave guide assembly, which will be more fully described below, to in essence "tailor" the output of the microwave oven 7 to the food product which is to be cooked. The conventional design for a microwave oven calls for electromagnetic radiation to be uniformly scattered throughout the enclosure of the unit due to the wide range of food products (shape, consistency, composition, etc.) which are to be cooked. Also to be considered are variations in placement of the food product within the microwave oven, which is often non-uniform at best. However, in the present case, the food product which is to be heated and/or cooked is known, and therefore more readily controlled, as will be discussed below. This includes specifics such as food type, size, density and placement within the microwave oven, and allows the microwave cooking process to be more effectively controlled to significantly reduce cooking times.

Figure 16:
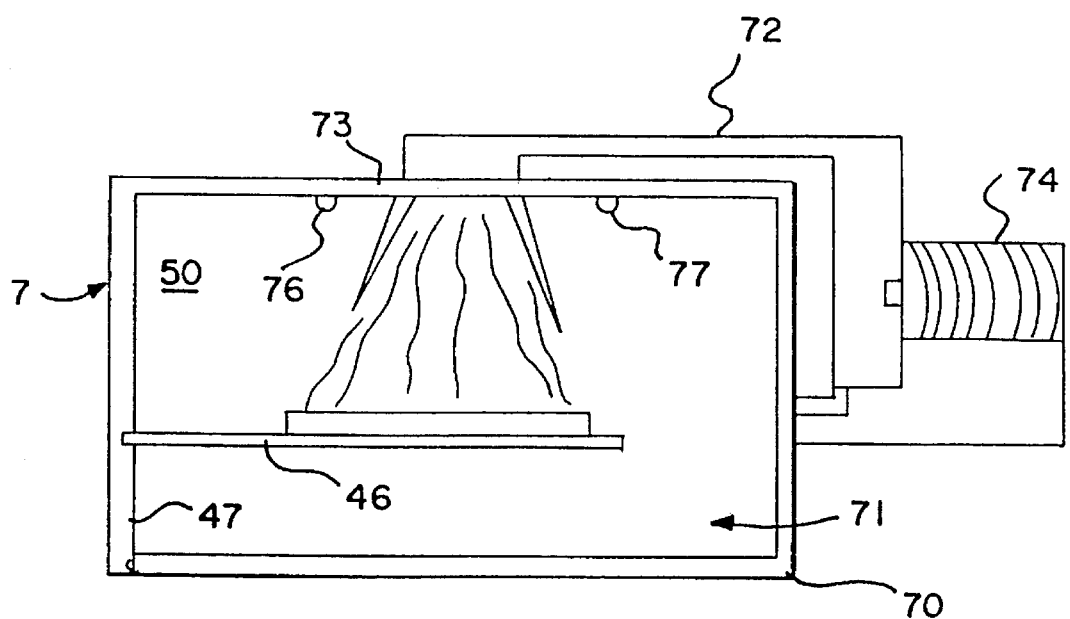
FIG. 16 is a partially sectioned, side elevational view of the microwave oven of the vending machine.

Referring now to FIG. 16, the microwave oven 7 of the present invention generally constitutes an enclosure 70 which is completed by the door 47, as previously described, to define a heating cavity 71. Electromagnetic radiation for heating the cavity 71 is developed by the magnetron gun 74, and emanates from a wave guide 72 positioned over the cavity 71 and extending through the top 73 of the enclosure 70. As previously indicated, the overall enclosure 70 and door 47 for the microwave oven 7 correspond to otherwise conventional structures, but for the transporter tray 46, which is configured to assist in the heating process. However, in the present configuration, the wave guide 72 is a modified structure, which will be described more fully below, which receives electromagnetic radiation from a magnetron gun 74 of increased capacity (at least 1,000 watts or more).

The wave guide 72 is advantageously configured to create a specified pattern for the discharge of electromagnetic radiation. For example, in heating a pizza, the wave guide 72 is advantageously configured to promote the creation of a conical pattern, generating a circle for covering the food product (e.g., an eight inch diameter circle to cover a seven inch pizza product). In this fashion, efficiencies of up to 96% can be achieved. While such heating is specific to a single shape, this is generally satisfactory in a vending machine application, and is readily modified to heat different types of food products in other machines which may be developed.

Figure 17:
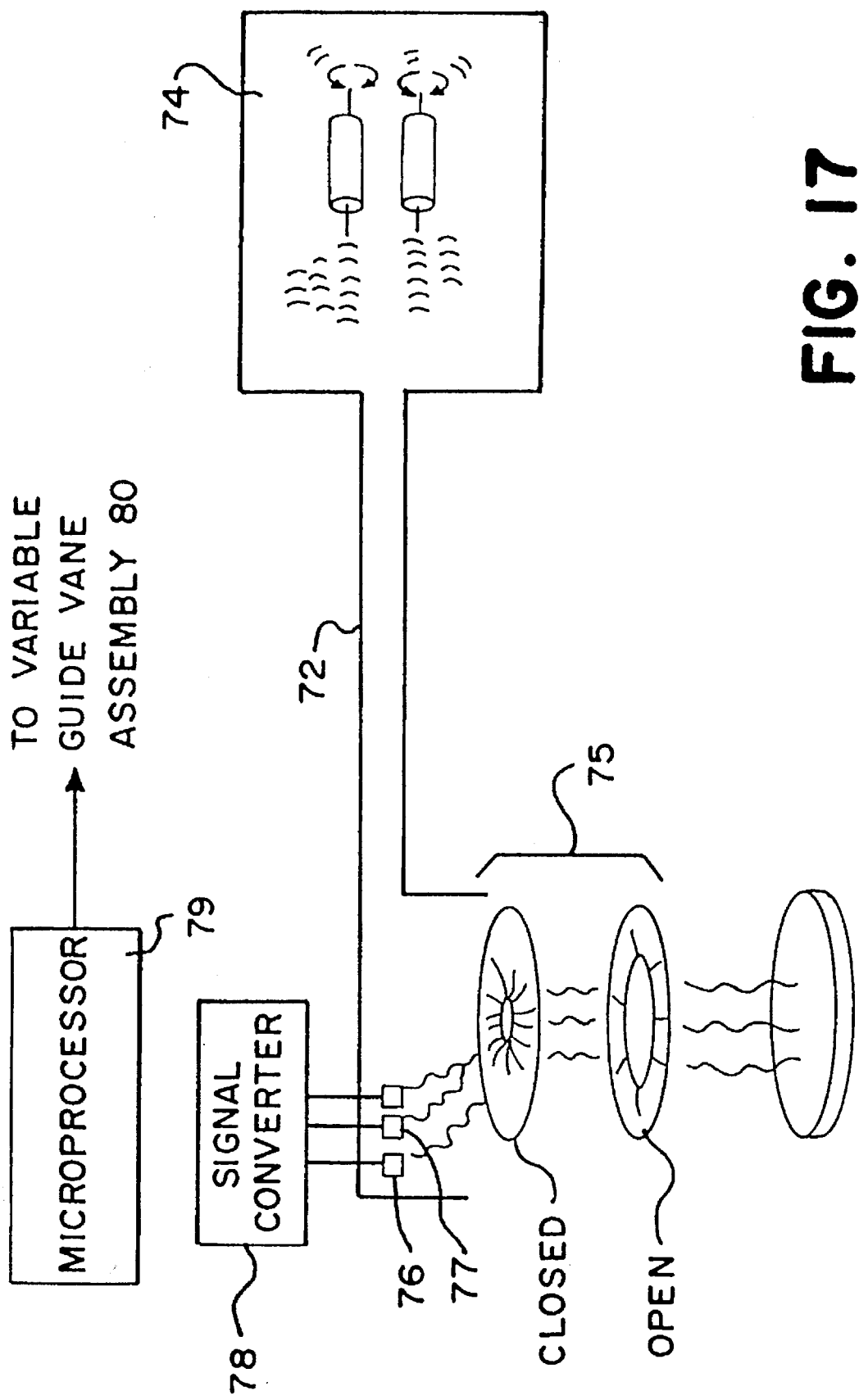
FIG. 17 is a schematic representation of the operative components of the microwave oven of FIG. 16.

In overall operation, and referring now to FIG. 17, electromagnetic radiation received from the magnetron gun 74 is passed through the wave guide 72 and directed toward the cavity 71 of the microwave oven 7. This is controlled by an iris (an iris diaphragm) 75 which is capable of opening and closing to regulate the application of electromagnetic radiation to the cavity 71. The iris 75 is operated responsive to sensors 76, 77 associated with the cavity 71 of the microwave oven 7. The sensor 76 is a moisture sensor which is capable of optically detecting moisture content of the food product as it is heated. The sensor 77 is an infrared sensor which is capable of detecting heat within the food product as it is heated. These sensors provide electrical signals for application to the microprocessor, which is capable of subdividing the food product to be heated into a grid pattern having defined regions which can be separately monitored by the sensors 76, 77. This is then used to control operation of the iris 75, as well as a directionally variable guide vane mechanism 80 associated with the wave guide 72, details of which will be provided below.

Microwave cooking is accomplished by producing electromagnetic waves (usually having a wave length of less than ten meters) which, when passed through the food product, causes oscillation of water molecules at a frequency which is sufficient to cause heat. Consequently, heating of the food product is greatly dependent upon the moisture content and density of the food product. It is for this reason that cooking by microwave heating techniques is seldom uniform, and difficult to accurately control. The moisture sensor 76 operates to accommodate this problem by determining the moisture content within the various grid sectors defined for the food product which is being heated, so that areas of higher moisture content can be provided with reduced levels of electromagnetic energy, while areas of lower moisture content can be provided with higher levels of electromagnetic energy, resulting in a more even heating of the food product. The infrared sensor 77 detects the heat within the various grid sectors which are developed, indicating the present condition (temperature) of the food product as it is being cooked. These parameters, together with information earlier received from the mass sensor 41 associated with the dispensing mechanism 6, can be used to effectively monitor the food product as it is being heated, to direct electromagnetic radiation to the various regions of the food product according to need. This not only results in an evenly heated food product, but also contributes to a food product which can be heated in the shortest possible time and to a closely controlled temperature.

Preferably, the moisture sensor 76 and the infrared sensor 77 are simultaneously polled for each region defined by the grid established for the food product to be heated. Electrical signals from the sensors 76, 77 are then delivered to a binary signal converter 78, which in turn communicates with the microprocessor 79 (Model 68HC11, Automatic Timing and Controls, Inc., King of Prussia, Pa., or equivalent), digitizing and storing information received from the sensors 76, 77 in accordance with the grid pattern established for the food product to be heated. Within the microprocessor, signals received from the sensors 76, 77 are processed by combining these signals in proportions established for the particular food product to be heated. For example, in heating a pizza, signals received from the infrared sensor 77 are preferably provided about twice the value of signals received from the moisture sensor 76 (defining a preferred $70/30$ combination). To be noted is that this proportion can change depending upon the food product which is to be heated and/or the heating requirements of the unit, resulting in variations in this proportion of from about $70/30$ to about $50/50$.

These signals are then processed to determine the current status of the food product as it is heated, supplying signals for controlling the iris 75 and the directionally variable guide vane mechanism 80 to modify the discharge of electromagnetic radiation into the cavity 71 of the microwave oven 7. To this end, signals from the microprocessor 79 are interfaced with the iris 75, opening and closing the iris as needed, and with the directionally variable guide vane mechanism 80, as follows.

Figure 18:
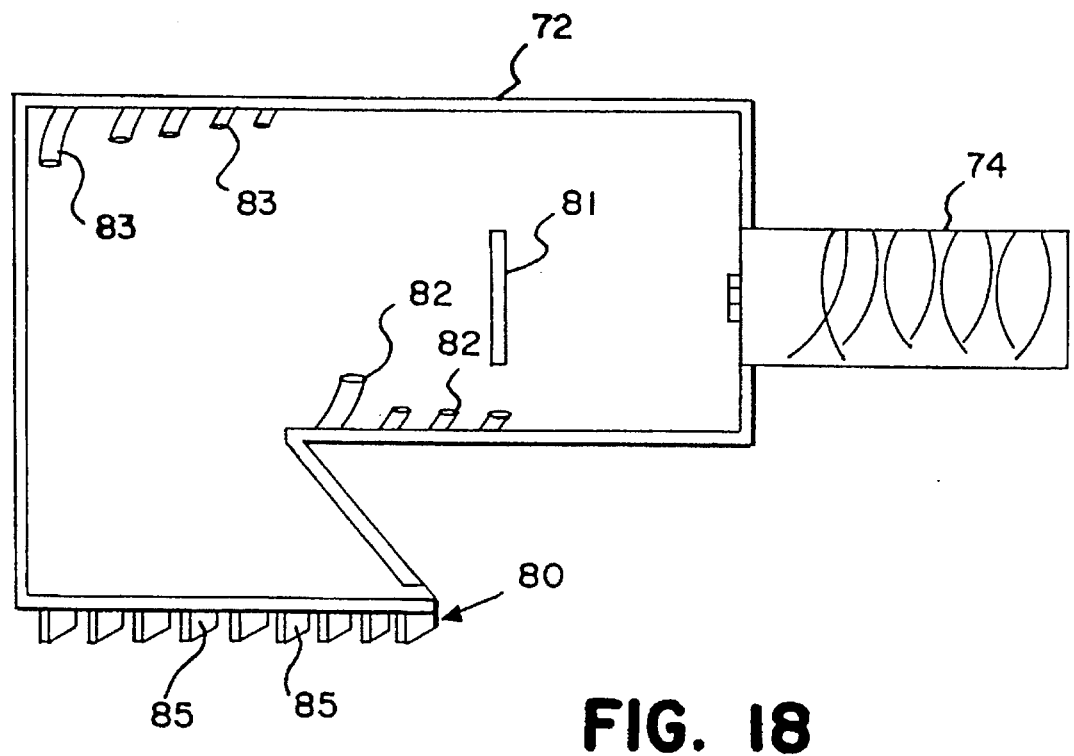
FIG. 18 is a cross-sectional view of the wave guide for the microwave oven of FIG. 16.

Referring now to FIG. 18, electromagnetic radiation produced by the magnetron gun 74 is discharged into the cavity of the wave guide 72, encountering an impingement wall 81. Such radiation further encounters a series of diffusers 82 and stationary turning vanes 83, directing the microwave radiation into a chamber which has a tuned shape, and which is used as a collector, and toward the directionally variable guide vane mechanism 80. The directionally variable guide vane mechanism incorporates a series of individual guide vanes 85 which are movable and variable, and which can change both the guide geometry as well as alter the wave direction. In this fashion, microwave radiation can be directed, as desired, within the cavity 71 of the microwave oven 7 based upon the shape, temperature and/or moisture content of the food product to be cooked.

Figure 19:
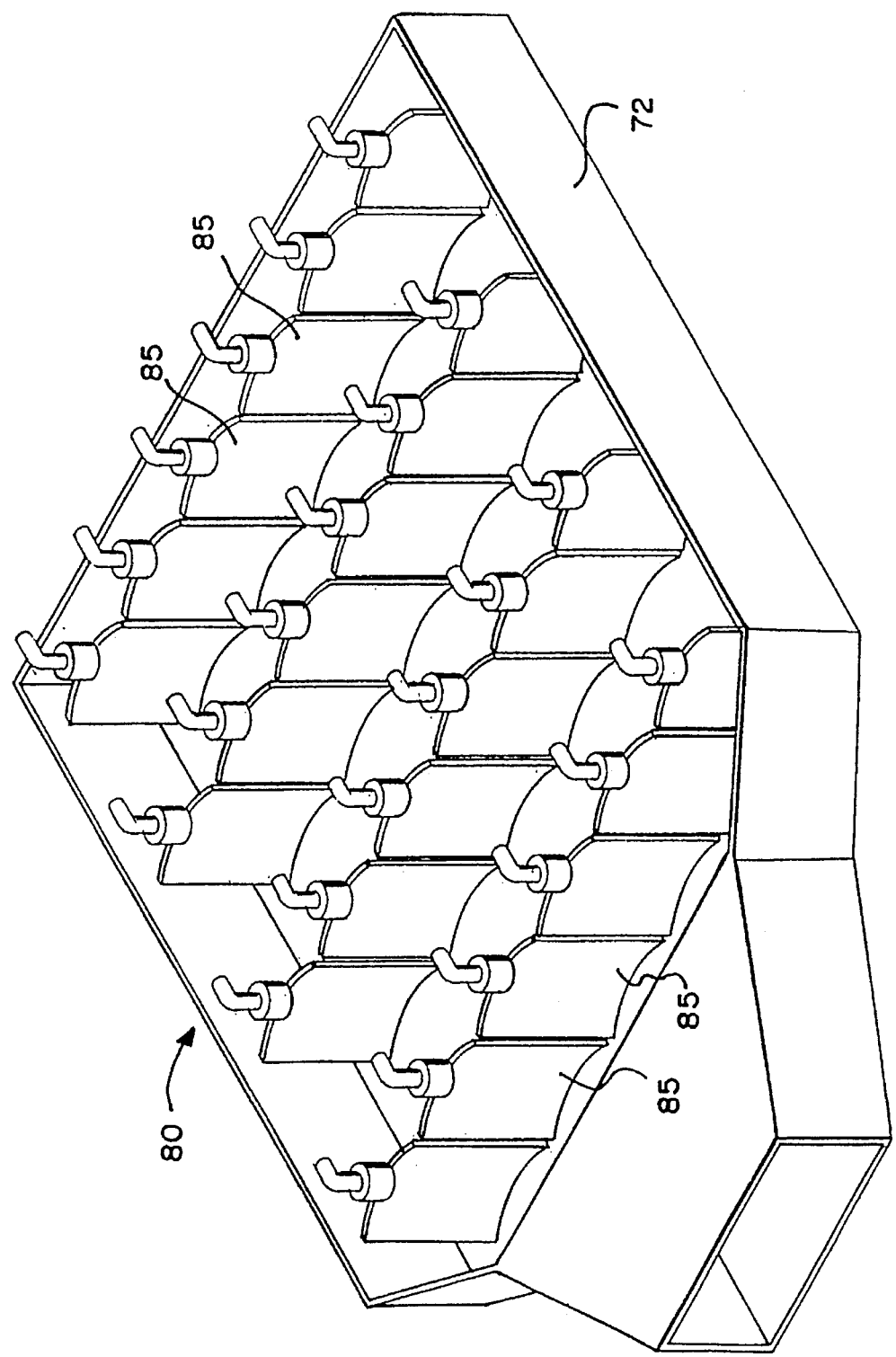
FIG. 19 is an isometric view of the directionally variable guide vane mechanism associated with the wave guide of FIG. 18.
Figure 20:
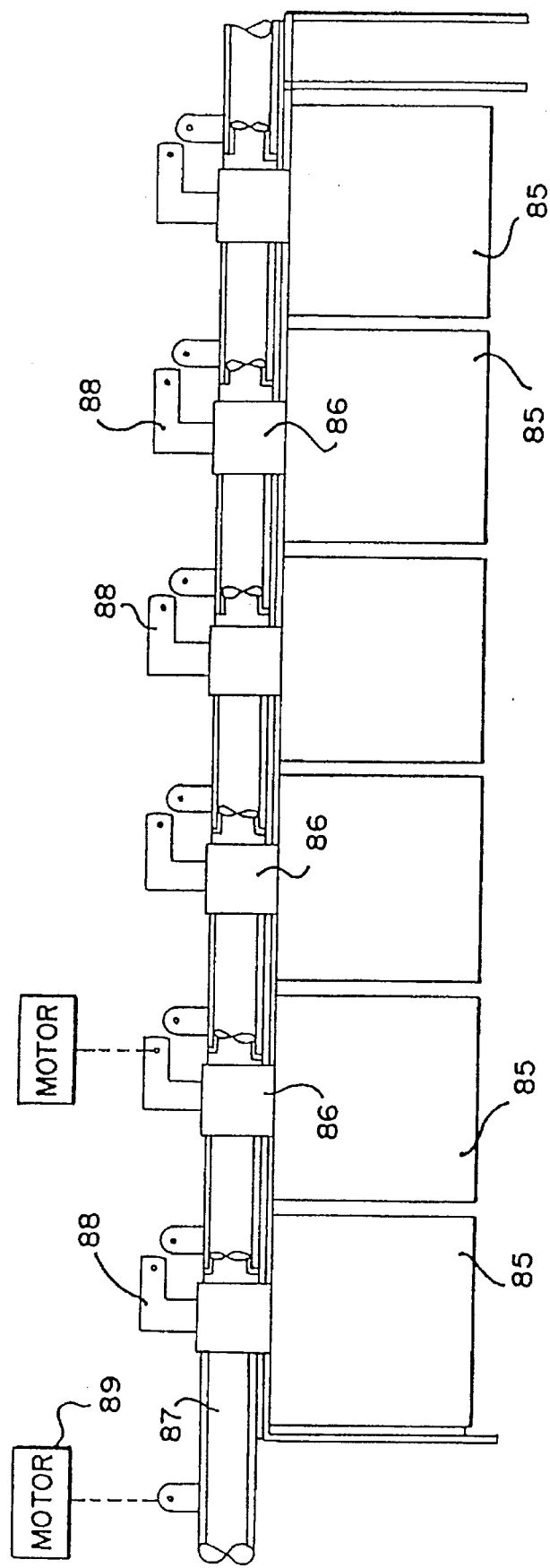
FIG. 20 is a partially sectioned, side elevational view of the guide vanes of the directionally variable guide vane mechanism of FIG. 19, showing their manner of attachment.
Figure 21:
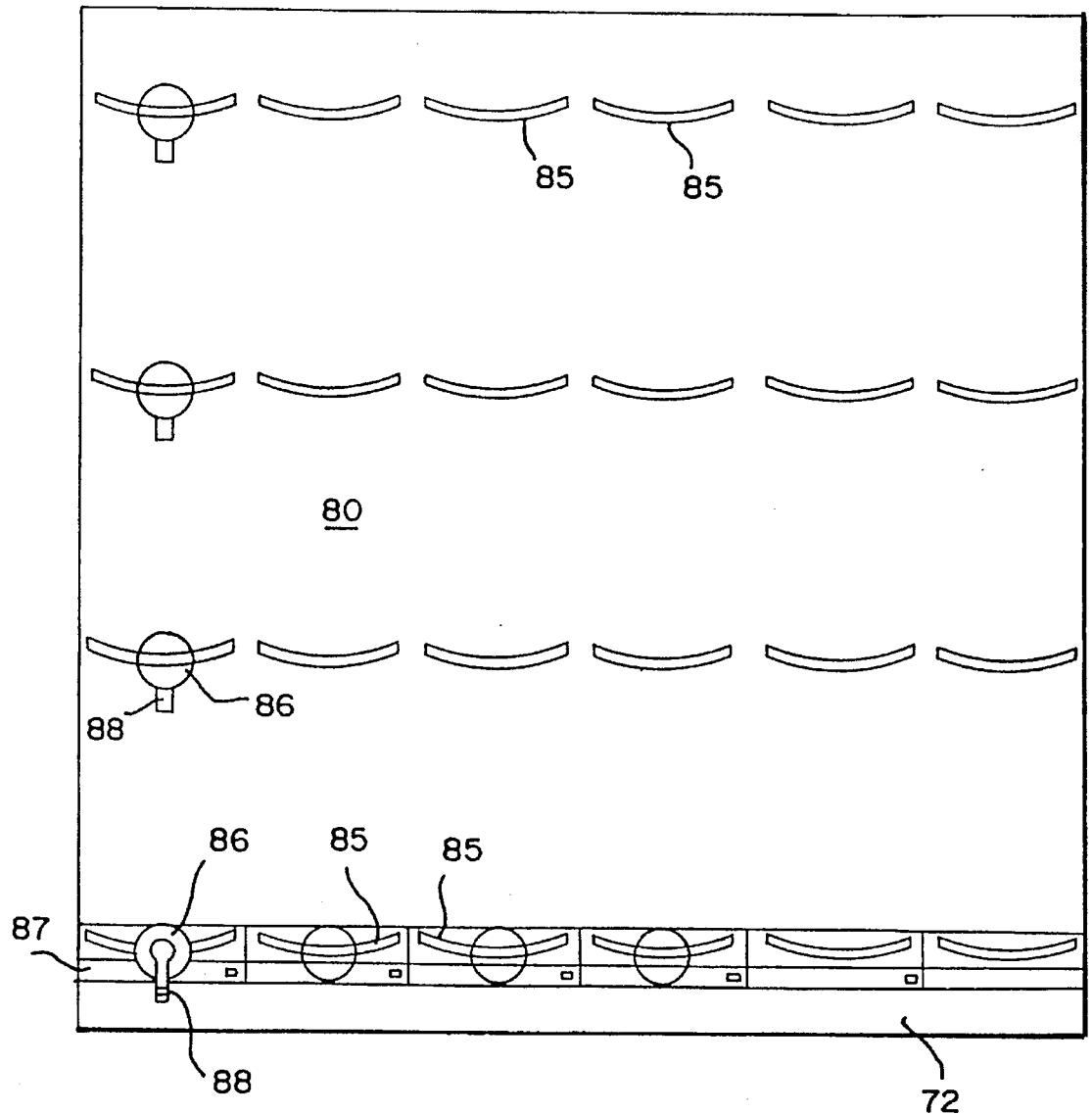
FIG. 21 is a top plan view of the directionally variable guide vane mechanism of FIG. 19.

FIGS. 19 to 21 further illustrate the structure comprising the directionally variable guide vane mechanism 80. As illustrated, a series of guide vanes 85 are provided which are made of an appropriate material such as "300 series" stainless steel, and which are preferably formed with a curvature on the order of 2.75 degrees. This curvature affords greater control in capturing the true rebound position of the microwave energy, and is also better for subsequently controlling its redirection. The guide vanes 85 incorporate a bearing 86 which permit each guide vane 85 to be rotated and/or tilted responsive to signals received from the microprocessor 79. To this end, each guide vane 85 extends through a fore/aft shaft 87 which is pivotable about its axis. Rotation (left/right) of the guide vane 85 is in turn accomplished responsive to a trunion 88. The shaft 87 and trunion 88 are mechanically interconnected with actuation motors 89, which preferably take the form of fractional linear induction motors (JOEL-type or equivalent). Such motors, as well as the controllers which operate them, are commercially available, and are readily interfaced with the microprocessor 79 using techniques which are themselves known. In so doing, the several guide vanes 85 are made individually and selectively rotatable and/or tiltable responsive to changes in the food product during the cooking process.

To be noted is that the clearance between the guide vanes 85 of the directionally variable guide vane mechanism 80 and the bottom of the collector box defined by the wave guide 72 must be kept to within one-eighth of an inch in order to prevent wave back-scatter. In addition, the trunion support for the guide vanes 85 must be tightly grounded using a fiber metal of the appropriate attenuation to cancel out arcing.

It should be noted that although the directionally variable guide vane mechanism 80 of the present invention is described for use in controlling microwave cooking by directing microwave energy toward various different areas of the food product being cooked (responsive to changes in moisture and/or heat content), it would also be possible to make use of the directionally variable guide vane mechanism 80 of the present invention to modulate the positions of the guide vanes 85 to provide a uniform wave density of equal value over the full target area. Many such variations are clearly possible making use of the directionally variable guide vane mechanism 80 of the present invention. This includes applications in vending machines such as the vending machine 1 previously described, as well as in conventional microwave ovens for cooking various different types of food products. In the latter case, similar "mapping" techniques may be used to monitor the food product as it is heated, and to regulate the electromagnetic energy directed into the open cavity of the microwave oven to evenly and more rapidly heat the food product in question. Examples of this are provided below.

EXAMPLE 1

Figure 22:
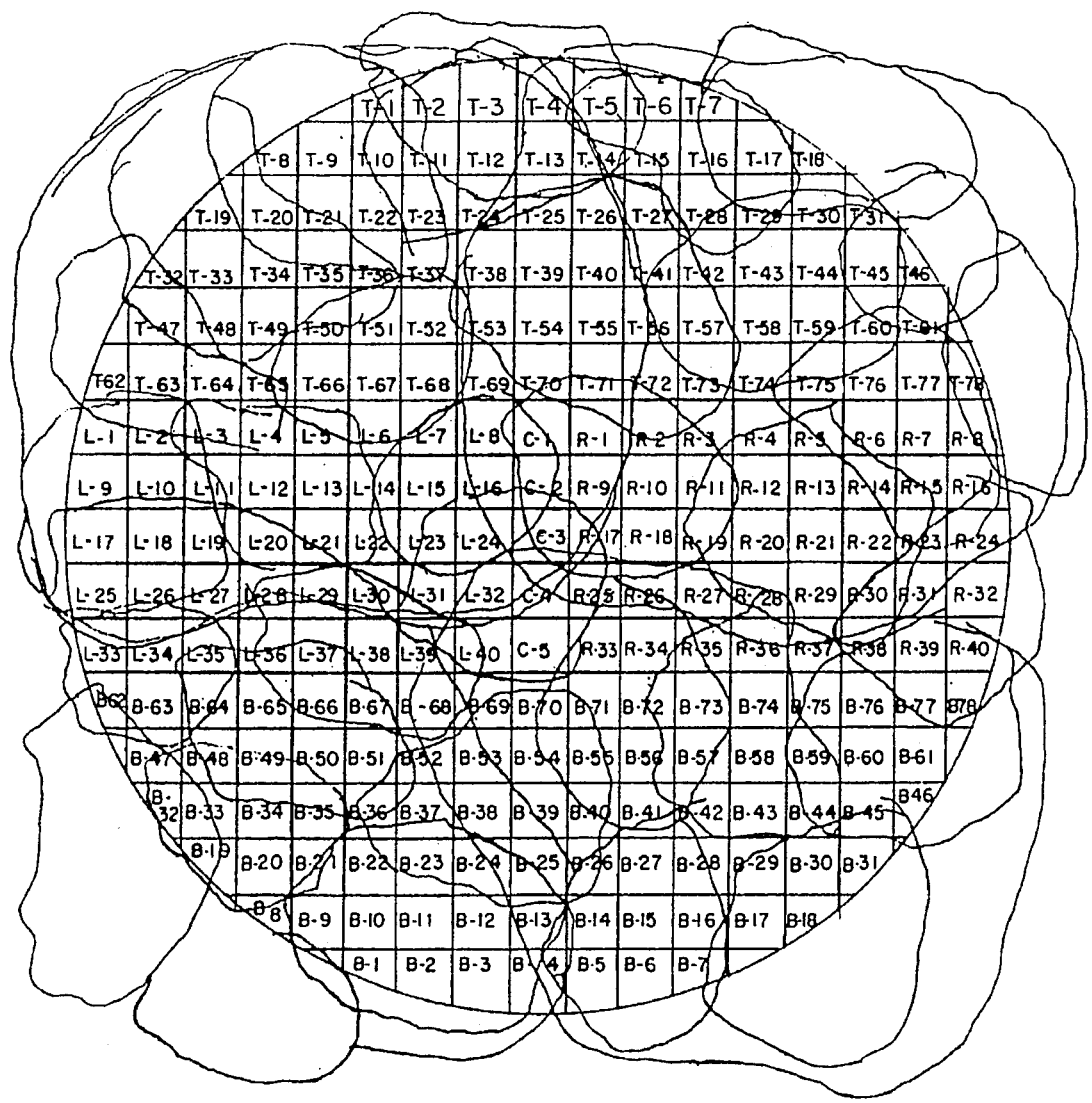
FIGS. 22 and 23 are schematic representations of infrared thermal mappings of a pizza product heated by the microwave oven of the present invention.

A pizza food product was heated using a Litton 1000 W modified microwave oven incorporating the directionally variable guide vane mechanism previously described and four quadrant SIY 120 mm JFM sensors. Each sensor was set to read a radial pattern of 164 mm (round) at a distance of 180 mm. A JOEL IR monitor was used externally to monitor temperature. As shown in FIG. 22, the grid patterns were set at a ⅜" square, which created a requirement for 289 grid sets to cover the 7" diameter pizza target. The four quadrant SIY sensor combination was coordinated to read all 289 areas, but to disregard grid squares outside of the target area. The test was conducted using a 1" thick layer of pancake batter (standard microwave energy absorption test method) contained in a 7" round glass pie container.

The sensors picked up larger blocks of infrared images (approximately 2" square) and caused multiple guide vane actuations to respond as blocks covering the 2" square. This sensing/reacting of actuators and guide vanes is believed to have been caused by the rapid heat diffusion throughout the "batter", leading to the conclusion that a ⅜" grid is often rather small and complex for cooking/heating food.

EXAMPLE 2

Figure 23:
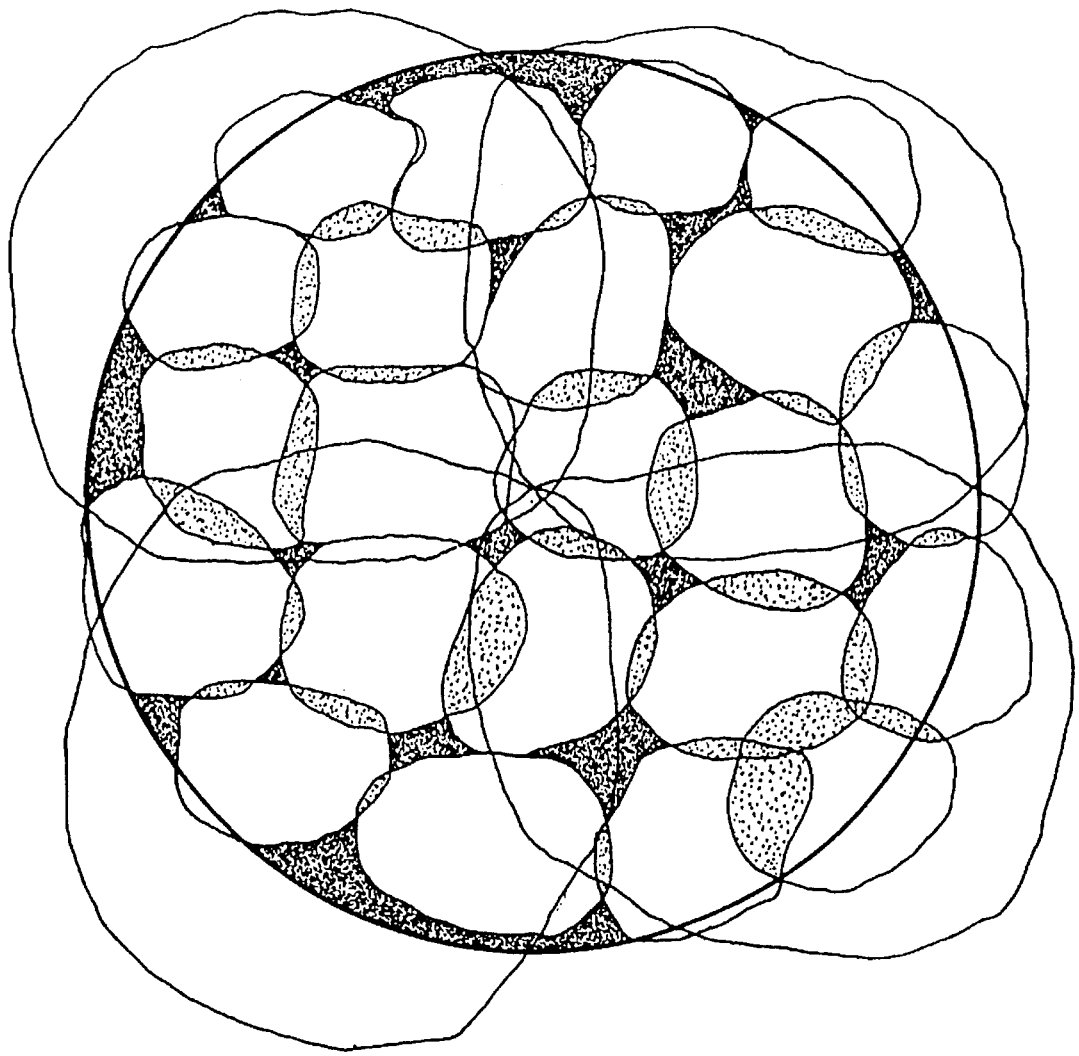

Testing was conducted the same as in Example 1, with the exception that the SIY 120 mm sensors were adjusted to a field of view of 2" areas, and the microprocessor was adjusted to develop 25 sites (as compared to 289). The IR readings were begun at 5 seconds and concluded at 58 seconds, at which time the batter test signature was traced (FIG. 23).

The results were greatly improved in that the variable modulating guide vanes operated very uniformly, directing microwave energy only to the cold areas and keeping the heating process very uniform throughout the 58 second exposure cycle. The guide vanes covered an individual area of 1.75" with little overlap.

In addition to the above-described improvements to the microwave oven 7, it has further been found to be quite important to develop a proper dough formulation in order to provide a food product (e.g., a pizza, pasta, pretzel, bun, roll, pita pocket or other dense dough-based product) which can be operated upon by the microwave oven 7 to provide a food product of proper quality in the rather short period of time required. To this end, a dough product has been developed which is ideally suited for baking, then freezing (and storing for desired periods of time), and then a microwave heat treatment to an edible temperature without undue burning and within a time of from about one to two minutes.

The dough mixture generally comprises a mixture of different flours constituted in a certain proportion of wheat flour with the balance in other grain flours, such as barley, soy, oat, rice, rye, millet and other grains. It has also been found that it is highly desirable that the wheat flour be a mixture of hard and soft wheat, such as white spring wheat flour (soft) and red winter wheat flour (hard). A preferred composition is described further below. It has been found that the flours (other than the wheat flours) should also be mixed in certain proportions. Preferably, the mixture comprises barley, soy and oat flour in relative proportions ranging from about 5 to 75%.

During the development of these preferred dough compositions, it was found that unlike in conventional doughs, the doughs of the present invention had little or no correlation to protein or gluten content (which caused the flour to harden in the microwave treatment of traditional crusts). This contributed to making the final product properties difficult if not largely unpredictable from the knowledge of the constitution of conventional products.

A preferred formulation for the dough composition comprises the following flour ingredients: white spring wheat flour (soft); red winter wheat flour (hard); Semolina flour (from Durum wheat); barley flour (preferably with at least 55% carbohydrates and not less than 10% protein); soy flour (preferably as defatted soy and lectin); and oat flour (preferably as Avenex with a fat content of not more than 5% and with a protein content of from 10 to 23%).

A particularly favored composition includes spring wheat, white soft (enriched); winter wheat, red hard (gluten and enriched); Semolina from Durum wheat; soy flour as defatted soy and lectin; and oat flour as Avenex.

It has been found that wheat flour in specified percentage should be a constituent of the dough composition. For optimum results, a maximum of about 65% by weight and not less than about 5% by weight of wheat flour is desired. Further, it is preferable for the wheat flour to be constituted by a mixture of at least two types of wheat, particularly red hard winter and soft white spring wheat. While it is not essential that the dough composition contain any hard red winter wheat, the presence of about 5% to about 15% by weight of the total composition of hard is highly desirable. Further, it has been found that it is preferable that the ratio of white soft spring wheat to hard red winter wheat flour be such that there is a greater proportion of the first with respect to the second. It appears that the effect of the spring wheat as opposed to the winter wheat on the final baked pizza composition, is not the same. A smaller percentage of winter wheat seems to have a larger effect than the same percentage of spring wheat. Thus, the adverse effect of hard winter wheat flour is perceptibly more evident than that of an equivalent amount of spring wheat flour. Spring wheat flour is more forgiving in its effects on the final product.

It has been found that Semolina flour (for instance, from Durum wheat) is a very desirable constituent of the dough composition. Theoretically, the winter wheat flour (hard) can all be substituted by and indeed the total proportion of winter wheat flour can be replaced by, Semolina flour. But for cost considerations, it is possible to use Semolina flour up to the range of from about 25% to about 35% by weight of the composition without adversely affecting the dough's performance and use. Unexpectedly, while the Semolina flour contributes significantly to a high protein (and is hard like winter wheat flour), it does not respond in an adverse way to microwave heating as does hard wheat.

It has further been found that in addition to the wheat flour component of the composition, the composition should preferably contain a balance of flours other than wheat flours. The balance or proportion (in percent by weight) of the other flours ranges from about 5% to 75% by weight. Typical of such flours other than wheat flours are barley, soy, oat, rice, millet, panicum, sorghum (Dura), corn and other flours.

For simplicity, the flours constituting the dough composition are divided into two groups. The first (Group A) is constituted of the wheat flours and the second (Group B) is constituted of the flours other than the wheat flours. The flours of Group A contribute to dough workability. The flours of Group B tend to detract from the workability and toughness of the dough, which is needed for pizza. The ingredients of the flours of Group B have different chemical and bio-chemical reactivity with respect to the flours of Group A. Typically, soy flour has the greatest reactivity with respect to the flours of Group A. It has also been noted that the flours of Group B have a favorable effect on flours of Group A, particularly in minimizing the over-cooking or burning and undue hardening of the baked, frozen and then microwave-treated dough composition.

With respect to the Semolina flour (from Durum wheat), it has been noted that when the proportion of Semolina flour is in the range from about 10% to about 15%, the response of the other ingredients and its contribution to the flour mixture and dough composition is quite favorable. If the proportion exceeds about 20% or 25%, then the Semolina causes a response like that of hard winter wheat flour.

Regarding taste, wheat contributes a desirable flavor which is customary, particularly in Western civilizations. When the product is formulated to please other tastes, the formulation can be modified by increasing or decreasing the other flours in an appropriate manner. For instance, for certain markets such as the Oriental markets, less critical of the wheat flour taste, it is acceptable to increase the proportion of rice or other flour. Yet, flavor is not the only determinative factor inasmuch as the reactivity of the particular flour may adversely or favorably affect the property of the frozen dough to produce on exposure to microwave treatment, a highly satisfactory baked pizza product.

The three main constituents which inter-react in the flour mixture and in the baked product include the amino acids, the cellulose and the gluten or protein composition.

A singular important aspect that contributes to differentiate the above-described pizza dough from the prior art dough compositions and final products, is the particular microwave treatment to which the baked dough composition of the invention is subjected. This microwave treatment causes an excitation upon re-heating the molecules of the baked dough which yields a satisfactory final product.

The dough composition of the present invention contains in addition to the blends of flours discussed above, conventional ingredients used in the preparation of food products such as pie crusts and other pastry components. These conventional components are not critical insofar as necessary to make a palatable product according to conventional formulating and processing techniques. The basic conventional ingredients of the above flour blends include water, fat or shortening material, or oils and yeast. A typical dough formulation which includes a dough blend of the present invention includes the wheat blends which are blended dry (for about 5 minutes in a tumble barrel) and then mixed with a yeast cake in a ratio of 15 ounces of yeast per 250 ounces of dry flour, mixed in a Hobart 20 quart mixer and adding 20 ounces of olive oil and tap water sufficient to make a pizza dough of appropriate consistency. The dough composition is allowed to rise and is then baked at 475° F. for 5 minutes in a hot ail, high impinger electric oven. After baking, the product is air cooled, vacuum bagged and quick-frozen to −35° F.

In heating, the frozen pizza is treated with microwave energy. Microwave energy can be very effectively employed to thaw frozen foods, because the heating effect penetrates deeply into the food product. What is more, due to its special flour blend, the frozen pizza is also ideally suited for microwave heating. The cooked pizza product which is obtained, even by conventional microwave treatment, is far superior in all respects to those previously manufactured.

There have been described above mixtures of flours which are especially well-suited for preparing baked dough products which are then deep-frozen and then subjected to microwave heating. From what has been described, it becomes apparent that it cannot be foreseen whether the final microwave heated product will be satisfactory or not. Whether a product will be satisfactory is not purely a subjective consideration. It has been found that there are products which upon microwave heating from the frozen stage turn out to be hard and rock-like, but not brittle; others (at the same microwave energy and exposure time) become hard and brittle, but not rock-like, even tough in all physical respects, like thickness, they are virtually the same. These are satisfactory objective criteria.

In an experiment using an all white wheat flour dough formulation where both high gluten, high protein flours were used and comparing this formulation with an all white wheat flour formula but using this time a low protein, low gluten flour, it was found that the high protein flour, when exposed to the same microwave reheating energy became very hard, almost rock like; while the low protein, dough flour became hard and brittle, but not rock like.

While no theory fully explaining these phenomena can be proposed, it appears at this time that the relative content of gluten and protein in the flours (and dough derived therefrom) have critical effects on the acceptability of the final product.

In work in conjunction with the invention, certain guidelines have been developed which lends itself particularly well for microwave heating to turn out a superior product. Such dough comprises a mixture of flours as follows:

| CONTROL BY PROTEIN | |
|---|---|
| Type | Protein % |
| Flour from wheat, Winter Hard | 10–30 |
| Flour from wheat, Spring Hard | 10–30 |
| Flour from wheat, Red Soft | 40–60 |
| Flour from wheat, Spring Soft | 18–45 |
| Barley flour | 10–65 |
| Corn flour | 5–75 |
| Rice flour | 2–28 |
| Rye flour | 5–70 |
| Soya flour | 25–62 |
| Soya Defatted | 25–58 |
| Durham | 10–30 |

This mixture provides a virtually ideal consistency of the final product by control of the percentage of the protein content. However, it has been found that the content of gluten is also very important if such a superior product is to be made.

A flour mixture which provides a virtually ideal consistency of the final product by control of the gluten content, cbmprises the following:

| CONTROL BY GLUTEN | |
|---|---|
| Type | Gluten % |
| Flour from wheat, Winter Hard | 1–12 |
| Flour from wheat, Spring Hard | 1–12 |
| Flour from wheat, Red Soft | 5–23 |
| Flour from wheat, Spring Soft | 4–18 |
| Barley flour | 4–26 |
| Corn flour | 0–3 |
| Rice flour | 0–13 |
| Rye flour | 0–30 |
| Soya flour | Not Applicable |
| Soya, Defatted | Not Applicable |
| Durham | 5–10 |

Thus, in accordance with the invention, there can be selected any flour in the above-recommended proportions to make up a virtually near ideal dough for further processing. The near ideal dough is thus constituted of a mixture of flours which preferably fall within the ranges specified of protein and gluten content. When products need not be as ideal as discussed, one can depart in one or more respects from the percentage of ranges specified and/or even omitting one or more ingredients of the mixture. However, it is understood that such variants though within the contemplation of the invention may result in a product that may be less than optimum, yet satisfy customers that may not be so demanding.

From work in conjunction with the invention, it has become increasingly apparent that the concentration of cellulose, amino acids, glutamate and the type of proteins in the different flours significantly affect the acceptability of the final microwaved, reheated product. Further, it does appear that not only the concentration of these components affect the acceptability of the final product, but the manner in which these components chemically and/or physically-chemically tie or react in the various grain/flour products. Some of the ingredients which have a binding (or perhaps a sequestering) effect are peptides, ribosome compounds and polymers. The interreactions between these binders, which may also be considered modifiers, appear to accelerate or decelerate the reactive changes brought about by the microwave energy upon heating the frozen product.

Another factor should be taken into account in addition to the protein content and the type of protein: this is the amino acid component of these flours. It does appear that the amino acids are different from flour to flour, at least to some extent, and react to microwave heating through a peptide linkage which appears not to be the same, i.e., different in the white wheat flour grains than in any other non-wheat flour grains, such as rye, rice, and soya wheats.

From further experimentation in conjunction with the invention, it appears that in white wheat flour dough an amino peptidase is formed during dough formulation and baking. The enzyme begins to catalyze (e.g., hydrolyze) the end molecules of the peptide having a free amino acid group. Presumably the liberated amino acid may cause further polymerization and thus an aglomerization of the monomers in both the protein and the cellulose. What has become apparent is that some modifiers in white wheat flour cause the higher gluten, protein flours to respond poorly to the specific microwave conditions at the energy levels recommended for heating the frozen, baked dough products.

It is further understood, though not yet explainable, that the different constituents found in white wheat flours in these concentrations play a major part in the microwavability of these doughs. These modifiers are: glutamate acid, peptides, ribosome amino acids and lignins.

It has been further discovered that various phase changes seem to occur in the white wheat dough based products which either do not occur or are of minor significance in the other flours. Some of these are thought to be the formation of amino peptidase, carboxy-methyl cellulose (from reactions with salt during baking), cellulose esters, and possibly lignin plastics or polymers. While these reactions are not fully understood, what may be suggested is that the excitation from the microwaves at the specific frequencies discussed above cause detrimental changes or effects on white wheat flour doughs.

It can be appreciated from the above that ideal edible dough based products of the invention result from mixtures of flours which contain certain components in certain acceptable ranges. Apparently the sequence of treatments to which these dough products are subjected, namely, the thorough mixing of the ingredients at the dough-making stage, generally at room temperatures, i.e., from about 20° C. to about 30° C., then the exposure to baking temperatures, then the exposure to freezing temperatures low enough and for a time adequately long to obtain a deep-frozen product which may be stored virtually indefinitely and then finally the exposure to microwave heating for a very limited time (such as for instance, about one to three minutes) are responsible for highly complex interactions between the components of the various flours used.

In conjunction with the invention it has been further determined that dough made from white wheat flour suffers when microwaved. It is thought that this effect is caused by peptide bonds in the various amino acid groups which are being broken down (presumably hydrolyzed) and/or modified. This in turn creates an unbalance of glutamate acid (as $C_5H_9O_4N$) and allows further and rapid polymerization of the large protein molecules. It is believed that this reaction begins by forming carboxymethyl cellulose upon exposure to the microwave radiation which causes the formation of cellulose gum. The concentration of polymer ($\beta$-D-glucose) continues to increase and causes a thickness as the dough is dehydrated during the microwave heating. The process seems to continue until all the free hydroxyl groups have been replaced entirely or in part causing a hard product due to cellulose ester, combined with the concentrate of lignin plastics (or polymers).

The reactions may be illustrated as follows

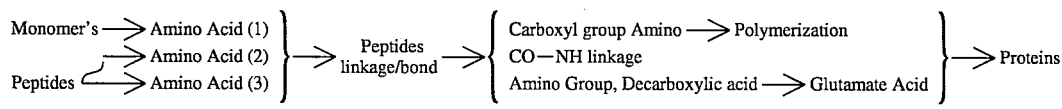

```
Amino Acids - Carboxyl group  ⎫                    Cellulose       ⎫
Amino Acids - Glutamate Acid  ⎪                    Lignins         ⎪
Amino Acids - α Ketoglutaric Acid ⎬─→ Proteins ─→  Proteins        ⎬ ─→
Amino Acids - Decarboxylic Acid ⎪                  Free Amino Acids⎪
   ─→ = Ribonucleic Acid (3 molecules) ⎭           Peptidase Enzymer⎭

└── Peptide Synthesis
```

```
                                      ⎧ Amino Peptides
                                      ⎪ Carboxymethyl Cellulose
                                      ⎪ Polymerization
              Microwave Cooking ──→   ⎨ Decarboxylic Acid
                                      ⎪ Cellulose Ester
                                      ⎩ Lignin Plastic ↓   ↓
                                      CAUSES HARD DOUGH
                                      CRUST IN WHEAT FLOUR
                                      BAKED PRODUCTS.
```

These chemical reactions are believed to be caused and/or promoted by the high cycle vibration or excitation created in the dough molecules which actually cause the chemical and molecular stripping of amino acid groups which normally have a stabilizing influence. These groups seem only (or primarily) to be associated with those peptides having a free terminal acid, thus with the catalysis (hydrolysis) which starts at the end of the peptide chain. This in turn begins a chain reaction that converts, it is believed all of the amino acid groups, or at least the larger proportion thereof, to glutamate. The glutamate (perhaps as glutamic acid) is believed to react with the cellulose in lignin to form a hardened polymer like product, which is undesirable.

These observations support the importance of maintaining the appropriate proportion of protein and gluten as discussed herein above.

Thus, it appears also that for the purposes of the invention, the content of white wheat flour is important. There appears to be no prior art literature which has recognized the possible adverse effects of white wheat flour at least in the context of making a dough product, such as a pizza by the steps described above ending with the step heating by microwave as performed herein. It should be noted that a product preferred for preparation in accordance with the invention are pizzas of a particular style, namely the New York type (or style) pizza. This is a recognized type which is different from other pizzas, like the sicilian style. It is considerably more difficult to obtain a satisfactory microwaved product from New York than from the other pizza types. This invention contributes to produce a fine product from dough products generally, especially pizzas of the New York type.

The above description has provided ample guidelines for one skilled in the art to produce a dough baked, reheated, frozen product in all acceptable respects.

Figure 24:
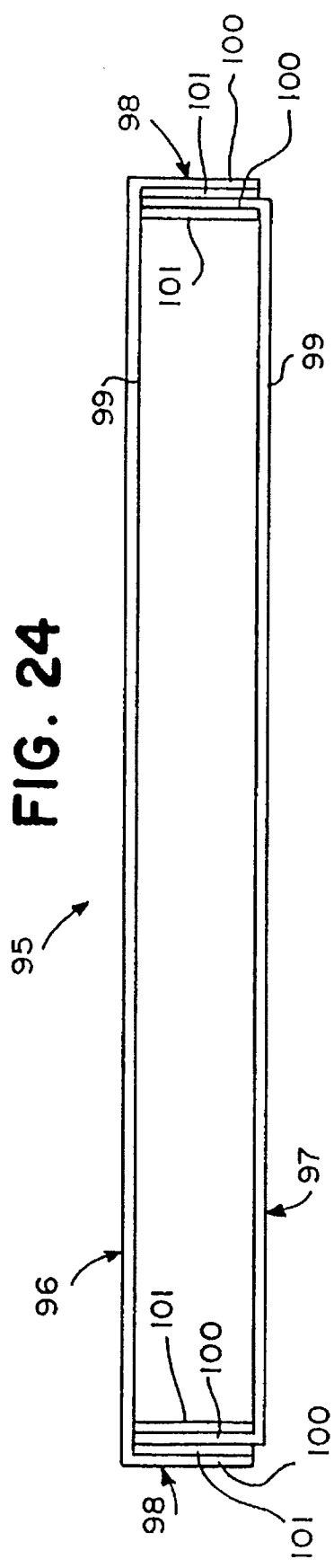
FIG. 24 is a cross-sectional view of a container for receiving the pizza product of the present invention.
Figure 25:
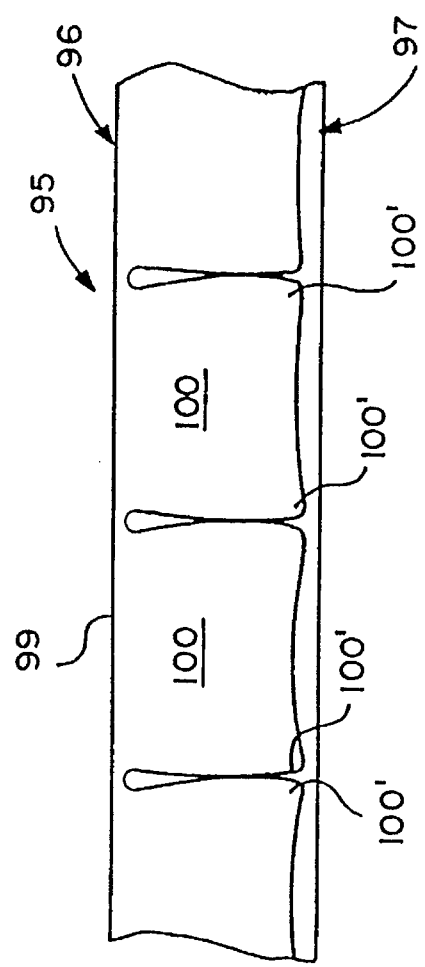
FIG. 25 is a partial, side elevational view of the container of FIG. 24.

Yet another consideration is the container for receiving the food product, both while in the freezer 5 and during heating within the microwave oven 7. As previously indicated, this requires a material which is resistant to freezer burn, and which is capable of releasing pressure (steam) developed during the microwave cooking process in controlled fashion. A container 95 suitable for use in this regard is illustrated in FIG. 24, and generally includes interconnecting top and bottom sections 96, 97 which are sealed together along the edges 98 making use of an appropriate tape or heat shrinkable material. The major faces 99 of the top and bottom sections 96, 97 are circular, to accommodate the shape of a pizza. The edges 98 are preferably formed as a double-walled construction. To this end, and referring to FIG. 25, a plurality of gussets 100 are folded inwardly from the top and bottom faces 99, respectively, and an inner backing member 101 (e.g., an adhesive tape on the order of 8 mils in thickness) is provided to secure the gussets 100 in position following folding, and up to final assembly of the top and bottom sections 96, 97 (following final assembly, the tape or heat shrinkable material operates to maintain the integrity of the container 95). The gussets 100 may either incorporate a straight cut, just meeting following folding, or a so-called "J" cut, developing extensions 100' following folding which can be joined together with, or even without employing the backing member 101.

Use of a double-walled construction is important in ensuring that an effective product load density can be maintained within the storage magazines 25 of the freezer 5, while keeping the dispensing mechanism 6 as simple as possible. It has been found that a construction of this general type can support a 25 pound load when spread over a 7 inch circle, the typical size of the pizza to be processed by the vending machine 1. The height of the box will of course depend upon the thickness of the pizza, with any toppings provided.

Of key importance in developing the container 95 of the present invention is the selection of materials used. The components of the container 95 are advantageously formed from a cardboard stock of controlled porosity, in the range of from about 18 to 29%. This range is sufficient to allow steam and gas to escape from the container while the food product is being heated, yet is sufficiently moisture resistant to retain an adequate amount of steam within the container for heating purposes, and to avoid freezer burn. To this end, a cardboard stock is used which incorporates a dull, outer white clay coating on both its top 96 and bottom 97. On the top section 96 of the container 95, an additional sizing is used which is made from wheat starch. This additional sizing operates to close and seal the pores on the top portion 96.

In operation, both the clay coating and the starch sizing work in combination to achieve different results at different times during the handling process. For example, the starch is significantly more soluble in water/vapor than is clay, and will therefore begin to dissolve as soon as steam begins to form in the container. On the other hand, the clay is more resistant to the solubilization process but is much more brittle than the starch sizing and will crack, leaving large open pores when the container deforms responsive to steam pressure developed within the container. In this fashion, a pressure of approximately 3 to 5 inch-ounces is developed at the peak of the heating process, just before the steam penetrates, and accordingly, solubilizes the sizing, enabling an appropriate release of steam and pressure.

It will be understood that various changes in the details, materials and arrangement of parts which have been herein described and illustrated in order to explain the nature of this invention may be made by those skilled in the art within the principle and scope of the invention as expressed in the following claims. It will further be understood that many of the components herein described, including the microwave oven 7, the dough composition, and the container 95, will find utility both separate from and in conjunction with the vending machine 1 of the present invention.

What is claimed is:

1. An apparatus for dispensing a food product, the apparatus comprising:

a plurality of magazines for receiving the food product in a stacked arrangement, each magazine defining an opening along a bottom thereof;

means for removing a bottom-most food product in a magazine from the remaining food products in the magazine including a single selector disk disposed beneath the plurality of magazines, said selector disk having a carrier hole of a size and shape for receiving and holding the removed food product, and a thickness corresponding to a height of the food product, wherein the selector disk is rotatable about an axis so that the carrier hole is movable beneath each of the magazines;

a base disposed beneath the selector disk, said base having a discharge opening therein;

means for rotating the selector disk relative to the magazines and relative to the discharge opening so that the received food product is disposed within the carrier hole responsive to rotation of the selector disk beneath the plurality of magazines, and is transferrable from the carrier hole to the discharge opening when the carrier hole is disposed over the discharge opening;

cooking means having a cooking means door for enclosing a cavity for receiving the discharged food product and cooking the discharged food product; and means for enclosing and surroundingly sealing the discharge opening and discharging the removed food product from the base by way of the discharge opening.

2. The apparatus of claim 1, further including sensor means for monitoring the apparatus and collecting data, means for communicating the data to a remote facility.

3. The apparatus of claim 1, wherein the magazines of the plurality of magazines are fixedly mounted on the apparatus.

4. The apparatus of claim 1, wherein said magazines are arranged in a plurality of nested groups, and including a plurality of concentric, annularly arranged selector disks, wherein each selector disk is independently rotatable beneath one of the groups of magazines, and a plurality of discharge openings defined in said base, wherein each discharge opening is associated with one of said selector disks.

5. The apparatus of claim 1, wherein the means for sealingly surrounding and enclosing the discharge opening is a discharge door which is slidingly disposed beneath the discharge opening.

6. The apparatus of claim 5, further including a transporter tray for transporting the removed food product.

7. The apparatus of claim 1, wherein the means for enclosing and surroundingly sealing the discharge opening and discharging the removed food product is a discharge door which is hinged beneath the discharge opening.

8. The apparatus of claim 7, wherein the hinged discharge door includes a disk and a resilient material around the disk for resiliently sealing the discharge opening.

9. The apparatus of claim 1, wherein a tray is pivotally affixed to the cooking means door for receiving the food product.

10. The apparatus of claim 9, wherein portions of the tray are formed integral to the cooking means door.

11. An apparatus for dispensing a food product, the apparatus comprising:

a plurality of magazines for receiving the food product in a stacked arrangement, each magazine defining an opening along a bottom thereof;

means for removing a bottom-most food product in a magazine from the remaining food products in the magazine consisting of a single selector disk disposed beneath the plurality of magazines, said selector disk having a carrier hole of a size and shape for receiving and holding the removed food product, and a thickness corresponding to a height of the food product, wherein the selector disk is rotatable about an axis so that the carrier hole is movable beneath each of the magazines;

a base disposed beneath the selector disk, said base having a discharge opening therein;

means for rotating the selector disk relative to the magazines and relative to the discharge opening so that the received food product is disposed within the carrier hole responsive to rotation of the selector disk beneath the plurality of magazines, and is transferrable from the carrier hole to the discharge opening when the carrier hole is disposed over the discharge opening;

cooking means having a cooking means door for enclosing a cavity for receiving the discharged food product and cooking the discharged food product; and means for enclosing and surroundingly sealing the discharge opening and discharging the removed food product from the base by way of the discharge opening.

* * * * *